(12) United States Patent
Ophardt et al.

(10) Patent No.: US 8,091,739 B2
(45) Date of Patent: *Jan. 10, 2012

(54) ENGAGEMENT FLANGE FOR FLUID DISPENSER PUMP PISTON

(76) Inventors: Heiner Ophardt, Vineland (CA);
Andrew Jones, Smithville (CA);
Zhenchun (Tony) Shi, Hamilton (CA);
Charles S. Charron, Oakville (CA); Ali Mirbach, Issum (DE)

( * ) Notice: Subject to any disclaimer, the term of this patent is extended or adjusted under 35 U.S.C. 154(b) by 383 days.

This patent is subject to a terminal disclaimer.

(21) Appl. No.: 12/318,027

(22) Filed: Dec. 19, 2008

(65) Prior Publication Data

US 2010/0140297 A1    Jun. 10, 2010

(30) Foreign Application Priority Data

Dec. 8, 2008  (CA) .................................... 2645953

(51) Int. Cl.
*B67D 7/06* (2010.01)
(52) U.S. Cl. ................................ 222/181.3; 222/321.8
(58) Field of Classification Search .................. 222/518, 222/383.1, 181.2, 181.3, 321.7, 321.8, 325, 222/321.6, 321.9, 509, 524, 525; 239/602, 239/600, DIG. 12; 403/329
See application file for complete search history.

(56) References Cited

U.S. PATENT DOCUMENTS

| | | | | |
|---|---|---|---|---|
| 2,466,899 A * | 4/1949 | Kincaid | .................. | 248/551 |
| 2,858,052 A * | 10/1958 | Costakos | .................. | 222/185.1 |
| 4,174,057 A * | 11/1979 | Emery | .................. | 222/332 |
| 4,240,570 A * | 12/1980 | Brown et al. | .................. | 222/442 |
| 4,667,854 A * | 5/1987 | McDermott et al. | .......... | 222/101 |
| 5,165,577 A | 11/1992 | Ophardt | | |
| 5,431,309 A | 7/1995 | Ophardt | | |
| 5,836,482 A | 11/1998 | Ophardt et al. | | |
| 5,975,360 A | 11/1999 | Ophardt | | |
| 6,053,370 A * | 4/2000 | Ludbrook et al. | ............ | 222/207 |
| 6,409,050 B1 | 6/2002 | Ophardt | | |
| 6,601,736 B2 | 8/2003 | Ophardt et al. | | |
| 7,225,948 B2 | 6/2007 | Ophardt et al. | | |
| 7,270,250 B2 | 9/2007 | Jones et al. | | |
| 2005/0205608 A1 * | 9/2005 | Ophardt et al. | ............ | 222/181.3 |
| 2006/0032871 A1 | 2/2006 | Ophardt et al. | | |
| 2006/0249538 A1 | 11/2006 | Ophardt et al. | | |
| 2008/0304978 A1 | 12/2008 | Ophardt et al. | | |
| 2008/0308574 A1 | 12/2008 | Ophardt et al. | | |
| 2009/0032552 A1 | 2/2009 | Ophardt et al. | | |

* cited by examiner

*Primary Examiner* — Kevin P Shaver
*Assistant Examiner* — Robert Nichols, II
(74) *Attorney, Agent, or Firm* — Thorpe North & Western LLP

(57) ABSTRACT

An improved arrangement for removably coupling a movable element of a piston pump to an actuator mechanism with the movable element including a resilient member which prevents radial movement of the movable element relative a catch member of the actuator mechanism from a coupled orientation unless the resilient member is deflected from an unbiased inherent configuration.

21 Claims, 37 Drawing Sheets

ENGAGEMENT FLANGE FOR FLUID DISPENSER PUMP PISTON

SCOPE OF THE INVENTION

This invention relates generally to fluid dispensers and, more particularly, to a piston pump for a liquid soap dispenser which is adapted for simplified replacement of a liquid soap reservoir.

BACKGROUND OF THE INVENTION

Many of today's products sold in liquid form, such as liquid hand soap, are contained in disposable containers or reservoirs which incorporate a pump assembly. Typically, the pump assembly includes a reciprocally movable element which when moved dispenses a quantity of liquid soap from the reservoir. The reservoirs are generally fitted within a permanent housing which includes a movable actuator assembly which engages and reciprocally moves the movable element to dispense the fluid. This has been found to be both a convenient and economical means of fluid supply and dispensation. Since the fluid reservoirs are replaced once the fluid supply is exhausted, it is desirable to manufacture the dispenser and reservoir so as to make replacement of the fluid reservoir as easy and quick as possible.

Known fluid dispensers suffer the disadvantage in ensuring the movable element is placed and maintained in a correct dispensing position relative the actuator assembly to properly dispense fluids. To achieve the proper dispensing configuration, the pump assembly must therefore be precisely aligned in the housing to ensure it is properly secured in or coupled to the actuator assembly. In some fluid dispensers, a disadvantage arises that after initial coupling of the movable element with the actuator assembly, the moveable element can with use come to be displaced out of proper alignment, for example, radially relative an axis about which the movable element is reciprocally movable.

Known fluid dispensers suffer the disadvantage that the coupling mechanism for coupling of the movable element and the actuator assembly permits movable elements having a wide variety of physical shapes and sizes to be coupled to the actuator assembly, and thus do not provide a keying or lock out arrangement for limiting replacement reservoirs which can be coupled to the housing to those with movable elements of limited particular shapes and sizes.

SUMMARY OF THE INVENTION

To at least partially overcome these disadvantages of known fluid dispensers, the present invention provides an improved arrangement for removably coupling a movable element of a piston pump to an actuator mechanism with the movable element including a resilient member which prevents radial movement of the movable element relative a catch member of the actuator mechanism from a coupled orientation unless the resilient member is deflected from an unbiased inherent configuration.

To at least partially overcome these disadvantages of known fluid dispensers, the present invention further provides an improved arrangement for removably coupling a movable element of a piston pump to an actuator mechanism in which the movable element requires an annular shape and size within specific maximums defined by an annular cavity within a catch member of the actuator mechanism, and by entrance way openings and/or exitway openings therefrom.

An object of the present invention is to provide a replaceable movable element in a pump mechanism with a resilient member requiring deformation for coupling and/or coupling of the movable element with the housing.

Another object is to provide a keying arrangement in which a catch member of the actuator mechanism limits the shape and size of the movable elements of a reservoir which can be coupled to the actuator mechanism.

The present invention provides in one aspect an improved fluid dispenser having a housing and a replaceable reservoir which incorporates as part of a fluid dispensing valve, a movable element. The housing includes a movable actuator assembly for coupling to the movable element. When the actuator assembly and movable element are in a coupled orientation, the movement of the actuator assembly moves the movable element axially on an axis to dispense fluid from the reservoir. When coupled, a resilient member on the movable element while in an unbiased inherent configuration engages with a catch member on the actuator assembly to prevent moving the movable element radially relative the catch member. For uncoupling of the actuator assembly and movable element, the movable element is moved radially relative the actuator assembly. From the coupled orientation on moving the movable element radially engagement between the catch member of the actuator assembly and the resilient member on the movable element deflects the resilient member from the unbiased inherent configuration to a deflected configuration permitting the resilient member and catch member to move radially to become uncoupled. The resilient member preferably extends radially outwardly from the movable element in the unbiased inherent configuration and the resilient member is resiliently deflectable radially from the inherent configuration to deflected configurations of different radial extents than the inherent configuration with the resilient member biased to return to the inherent configuration when deflected from the inherent configuration.

The actuator assembly may be configured such that the reservoir is not only removable from coupling with the actuator assembly by relative movement in a radial direction but may also be coupled to the actuator assembly by being moved in a radial direction relative the actuator assembly.

The actuator assembly may be configured such that the reservoir is removable from coupling with the actuator assembly by relative movement in a radial direction and may also be coupled to the actuator assembly by being moved in an axial direction relative the actuator assembly. In this regard, the actuator assembly may be configured such that if the reservoir is inserted into the housing in a axial uncoupled orientation relative the actuator assembly, the first activation of the dispenser moves the actuator assembly axially relative to the movable element to a position where the movable element and actuator assembly are secured together in the coupled orientation. The dispenser may thus permit insertion of a replaceable reservoir into the housing with the movable element in various axial positions relative the reservoir.

The dispenser of the present invention advantageously permits easy replacement and removal of the reservoir. The reciprocally movable element includes a catch assembly. The catch assembly is configured to permit movement of the actuator assembly radially relative to the reciprocally movable element from a coupled orientation to an uncoupled orientation. Once in the coupled orientation, the catch assembly prevents movement of the actuator assembly relative to the movable element to return to the uncoupled orientation unless a resilient member on the movable member is suitably deflected.

Preferably, the reciprocally movable member is a piston element which, on insertion of the reservoir into the housing, is positioned coaxially aligned with the actuator assembly. The piston element includes a resilient member. A catch member of the actuator assembly is to be engaged with the resilient member of the piston element to couple the piston element to the actuator assembly in a coupled orientation. The resilient member on the piston element is deflectable on radial movement of the piston element relative catch member of the actuator assembly to permit uncoupling of the catch member of the actuator assembly with the piston element.

The resilient member on the piston element preferably extends radially of the piston element circumferentially about the piston element. Deflection of the resilient member permits the catch member of the actuator assembly to move past the resilient member for uncoupling. When the resilient member assumes its unbiased condition in the coupled orientation, it prevents removal of the piston element from catch member of the actuator assembly by movement in a direction radially of axis and the piston element is reciprocally movable with the actuator assembly to dispense fluid. The resilient member may comprise a set of resilient finger members disposed circumferentially about the piston element extending from fixed ends of the finger member coupled to the piston element to distal ends, and sized to be deflected radially inwardly to pass through a radially extending exitway opening in the catch member of the actuator member. The finger member in their unbiased positions prevent passage of the finger members radially through the exitway opening.

Preferably, the exitway has camming surfaces about the exitway opening which are to be engaged by the finger members on the piston element such that on radial movement of the piston element from the uncoupled orientation, engagement between the camming surfaces and the finger members urges the finger members to adopt a deflected configuration permitting the finger members to pass radially through the exitway to a radial uncoupled orientation.

In one aspect, the present invention provides a dispenser for dispensing fluid comprising:

a housing, a fluid containing reservoir having an outlet, the housing supporting the reservoir in a dispensing position, the reservoir being insertable into said housing to assume said dispensing position and removable therefrom for replacement, a valving mechanism disposed across the outlet for dispensing fluid from the reservoir, the valving mechanism comprising a reciprocally movable element for reciprocal movement along an axis relative to the housing when the reservoir is in the dispensing position to dispense fluid, the housing including an actuator mechanism for actuating the reciprocally movable element, the actuator mechanism movable relative the housing between a first position and a second position, the actuator mechanism including a catch member, the movable element including an engagement mechanism to engage the catch member and releasably couple the movable element to the actuator mechanism in a coupled orientation in which movement of the actuator mechanism between the first position and the second position results in axial reciprocal movement of the movable element, the engagement mechanism comprising a resilient member extending radially axially outwardly from the movable element in an unbiased inherent configuration, the resilient member being resiliently deflectable radially from the inherent configuration to deflected configurations of different radial extents than the inherent configuration and biased to return to the inherent configuration when deflected from the inherent configuration, wherein from the coupled orientation on moving the movable element radially relative the catch member engagement between the catch member and the resilient member on the movable element deflects the resilient member radially from the inherent configuration to one of the deflected configuration permitting the resilient member and catch member to move radially from the coupled orientation to a radial uncoupled orientation in which the reservoir may be removed from the housing, in the coupled orientation the resilient member while in the inherent configuration engaging with the catch member to prevent moving the movable element radially relative the catch member from the coupled orientation to the radial uncoupled orientation.

In another aspect, the present invention provides a dispenser for dispensing fluid comprising:

a housing, a fluid containing reservoir having an outlet, the housing supporting the reservoir in a dispensing position, the reservoir being insertable into said housing to assume said dispensing position and removable therefrom for replacement, a valving mechanism disposed across the outlet for dispensing fluid from the reservoir, the valving mechanism comprising a reciprocally movable element for reciprocal movement along an axis relative to the housing when the reservoir is in the dispensing position to dispense fluid, the housing including an actuator mechanism for actuating the reciprocally movable element, the actuator mechanism movable relative the housing between a first position and a second position, the actuator mechanism including a catch member, the movable element including an engagement mechanism to engage the catch member and releasably couple the movable element to the actuator mechanism in a coupled orientation in which movement of the actuator mechanism between the first position and the second position results in axial reciprocal movement of the movable element, the catch member having a side wall which extends axially relative the axis and circumferentially relative the axis to define a central cavity therein coaxially about the axis, a radial exitway extending radially from the cavity through the side wall, in the coupled orientation the movable element located coaxially within the cavity, the engagement mechanism comprising a resilient member carried on the movable element, the resilient member inherently assuming an unbiased inherent configuration, the resilient member being resiliently deflectable from the inherent configuration to deflected configurations and inherently biased to return to the inherent configuration when deflected from the inherent configuration, in the coupled orientation the resilient member while in the inherent configuration engaging with the side wall of the catch member to resist moving the movable element radially relative the catch member from the coupled orientation through the exitway to the radial uncoupled orientation, wherein from the coupled orientation on moving the movable element radially relative the catch member toward the exitway engagement between the catch member and the resilient member on the movable element deflects the resilient member from the inherent configuration to deflected configurations conforming to a shape of the exitway so as to permit the deflected resilient member to move radially from the coupled orientation through the exitway to a radial uncoupled orientation.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
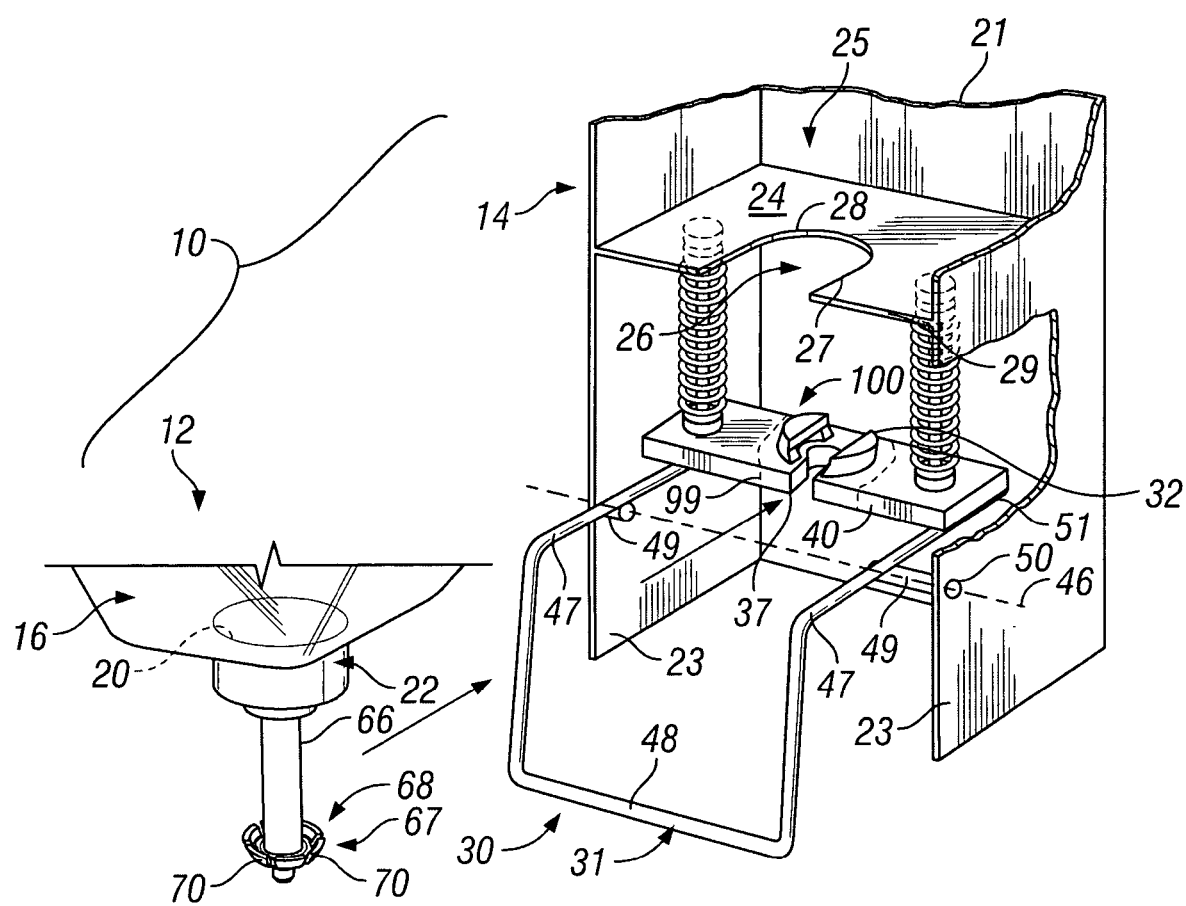
FIG. 1 is an exploded partial perspective view of a first preferred embodiment of a housing and reservoir of a dispenser in accordance with the invention illustrating a reservoir ready for insertion by relative horizontal movement.

Reference is made first to FIG. 1 which shows a dispenser 10 in accordance with a preferred embodiment of the invention. The dispenser 10 comprises a reservoir 12, and a housing 14.

The reservoir 12, only partially shown, comprises a chamber 16 for holding fluid 18 as, for example liquid soap, which is to be dispensed. An outlet 20 is provided through a lowermost wall 17 of the chamber 16, across which is located a valve assembly 22 to regulate the flow of fluid 18 outwardly therethrough. Preferably the reservoir 12 is made entirely of plastic and is disposable once the supply of fluid 18 is exhausted.

FIG. 1 shows the housing 14 in an open configuration ready for insertion of the reservoir 12. The housing 14 includes a backplate 21 typically adapted for permanent attachment to a wall. A pair of side walls 23 extend vertically forwardly from each side of the backplate 21. A support flange 24 is provided extending horizontally between the side walls 23 so as to define a cavity 25 above the flange 24 between the side walls 23 and backplate 21 to receive the reservoir 12.

The flange 24 has an opening 26 vertically therethrough in the form of a U-shaped slot 27 closed at a rear blind end 28 and open forwardly to the front edge 29 of the flange 24.

An actuator assembly 30 is provided on the housing 14, movable relative to the housing. The actuator assembly 30 includes notably a pivoting lever 31 and an actuator plate 32 mounted to the housing to be vertically slidable. Pivoting of the lever 31 moves the vertically slidable actuator plate 32 linearly on a pair of vertically extending guide rods 33 against the bias of springs 34 disposed about the guide rods 33. The actuator plate 32 has a downwardly directed lower surface 35 and an upwardly directed upper surface 36, each extending normal to the linear path of movement of the actuator plate 32.

The actuator plate 32 has a catch opening 37 vertically therethrough and open forwardly to the front edge 40 of the actuator plate 32.

The two parallel spaced locating rods 33 are fixedly secured at their upper ends 41 to flange 24 and extend downwardly to their lower ends 42 to which respective retaining ferrules 43 are secured. The actuator plate 32 has a pair of cylindrical bores 44 through which the rods 33 pass. The actuator plate 32 is disposed on the rods 33 above the ferrules 43.

Springs 34 are provided about each of the locating rods 33. The springs 34 have an upper end which engage the flange 24 and a lower end which engage the upper surface 36 of actuator plate 32 to resiliently bias the actuator plate 32 away from the flange 24 downwardly toward a fully extended position shown in FIGS. 1 to 3.

The actuator assembly 30 includes the lever 31 which is pivotally connected to the housing 14 for pivoting about a horizontal axis 46. The lever 30 is U-shaped having a pair of side arms 47 connected at their front by a horizontal connecting bight 48. A pair of horizontal stub axles 49 extend laterally outwardly from the side arms 47 and are received in holes 50 through the side walls 23 to journal the lever 31 to the housing for pivoting about an axis 46.

A rear end 51 of the lever 31 engages the lower surface 35 of the actuator plate 32. Manual urging of the bight 48 of the lever 31 rearwardly by a user moves the actuator plate 32 upwardly against the bias of the springs 33 from the extended position shown in FIG. 2 to a retracted position shown in FIG. 4. On release of the lever 31, the force of the springs 33 returns the actuator plate 32 to the extended position.

The opening 26 of the flange 24 is positioned to permit the reservoir 12 to be slid rearwardly inward into the housing 14, in the manner illustrated in FIG. 1. The flange 24 is located such that when the reservoir 12 is slid into the housing 14, the flange 24 abuts and supports the lowermost wall 17 of the fluid chamber 16 to assist in maintaining the reservoir 12 in fluid dispensing position. The flange 24 is received in a slotway 52 between the lowermost wall 17 of the fluid chamber 16 and an upwardly directed shoulder 53 on the valve assembly 22 such that the flange 24 is sandwiched between the wall 17 and the valve assembly 22, thereby preventing axial sliding movement of the reservoir 12 as the dispenser 10 is used. The U-shape of the opening 26 of the flange 24 assists in guiding the reservoir 12 as it is inserted into and removed horizontally from the housing 14.

Figure 2:
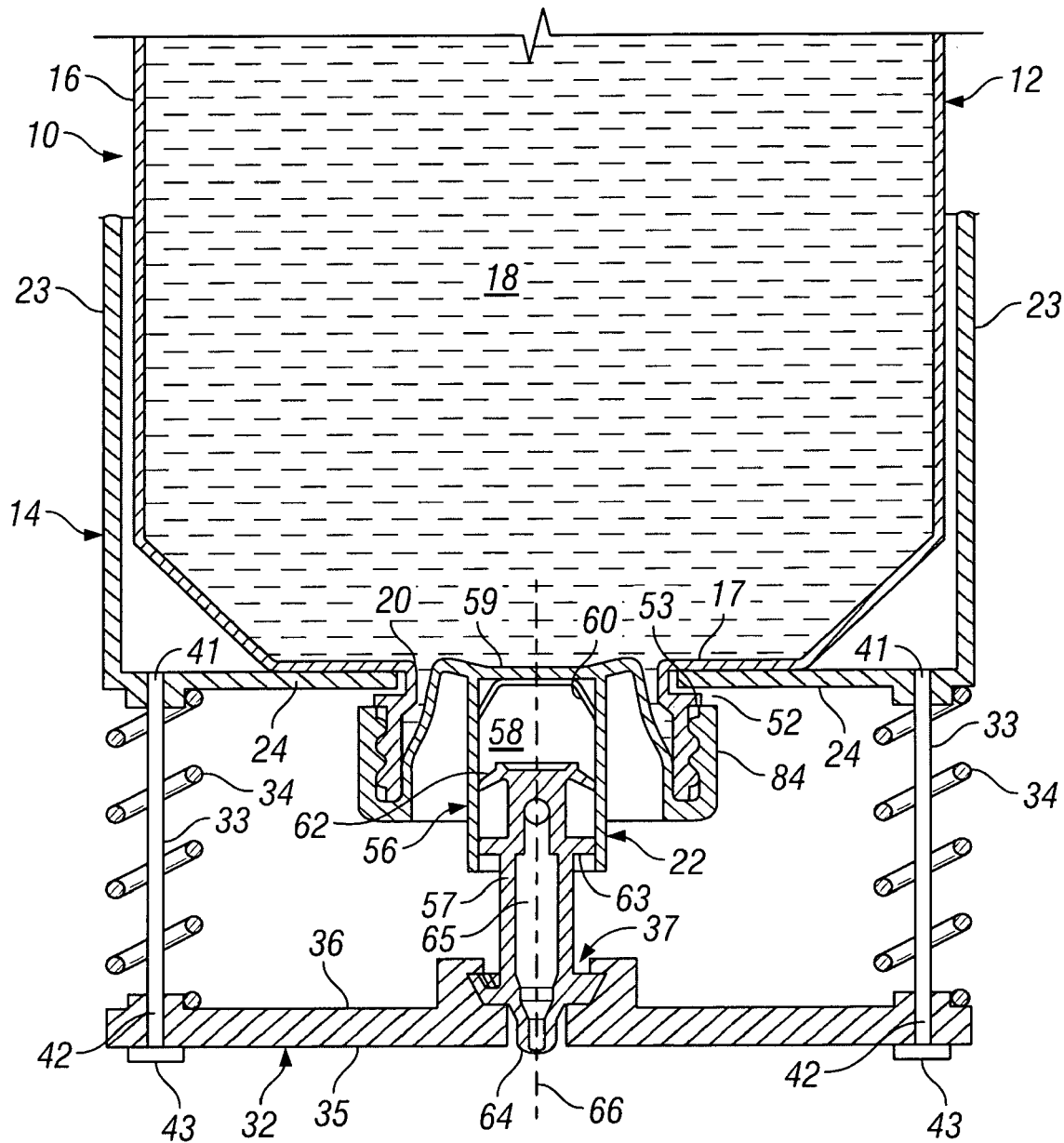
FIG. 2 is a partial cross-sectional front view of the housing and reservoir of FIG. 1 in a coupled orientation with an actuator assembly of the housing and a reciprocally movable piston element of the reservoir in a fully extended rest position.
Figure 3:
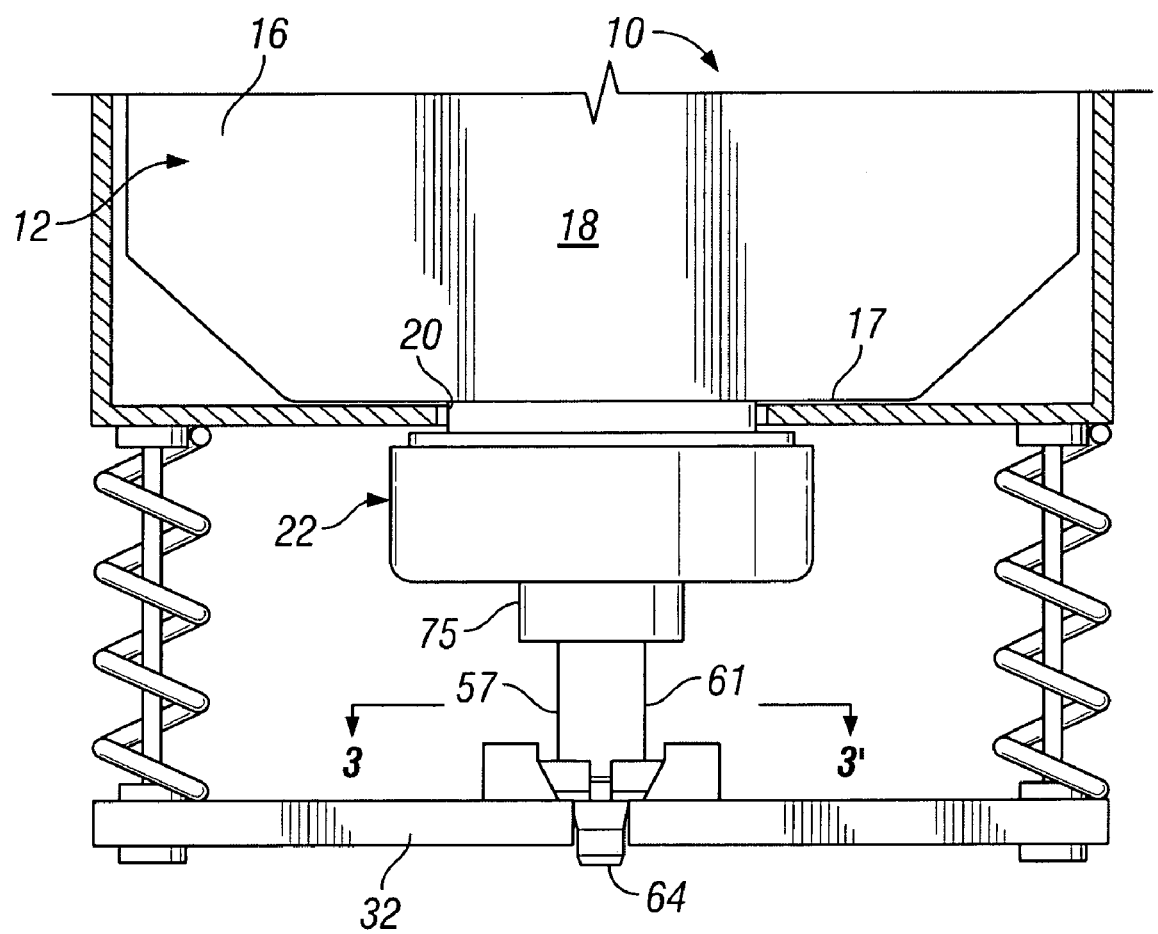
FIG. 3 is a front view of the housing and reservoir as in FIG. 2.

FIG. 2 best shows the reservoir valve assembly 22 as comprising a piston pump of the type described in U.S. Pat. No. 5,165,577 to Ophardt issued Nov. 24, 1992. The valve assembly 22 includes piston chamber forming member 56 and a piston element 57. The piston chamber forming member 56 forms a dispensing chamber 58 having at an inwardmost end an inlet opening 59 opening into the chamber 16. A one-way inlet valve 60 is provided across the inlet opening 59 which permits fluid 18 to flow outwardly from the chamber 16 into the dispensing chamber 58 but prevents flow from the dispensing chamber 58 to the chamber 16. The reciprocally movable piston element 57 is coaxially slidably received within the dispensing chamber 58 for reciprocal relative sliding about an axis 66. The piston element 57 has an axially extending hollow stem 61 which carries a flexible inner flange 62 and an outer sealing flange 63 to engage the inner wall of the dispensing chamber 58 in a manner that reciprocal movement of the piston element 57 axially along the axis 23 in the dispensing chamber 58 causes fluid 18 to flow from the chamber 16 outwardly past the one-way valve 60 and out an outermost end 64 of the piston element 57 via an internal passageway 65 through the stem 61.

Figure 6:
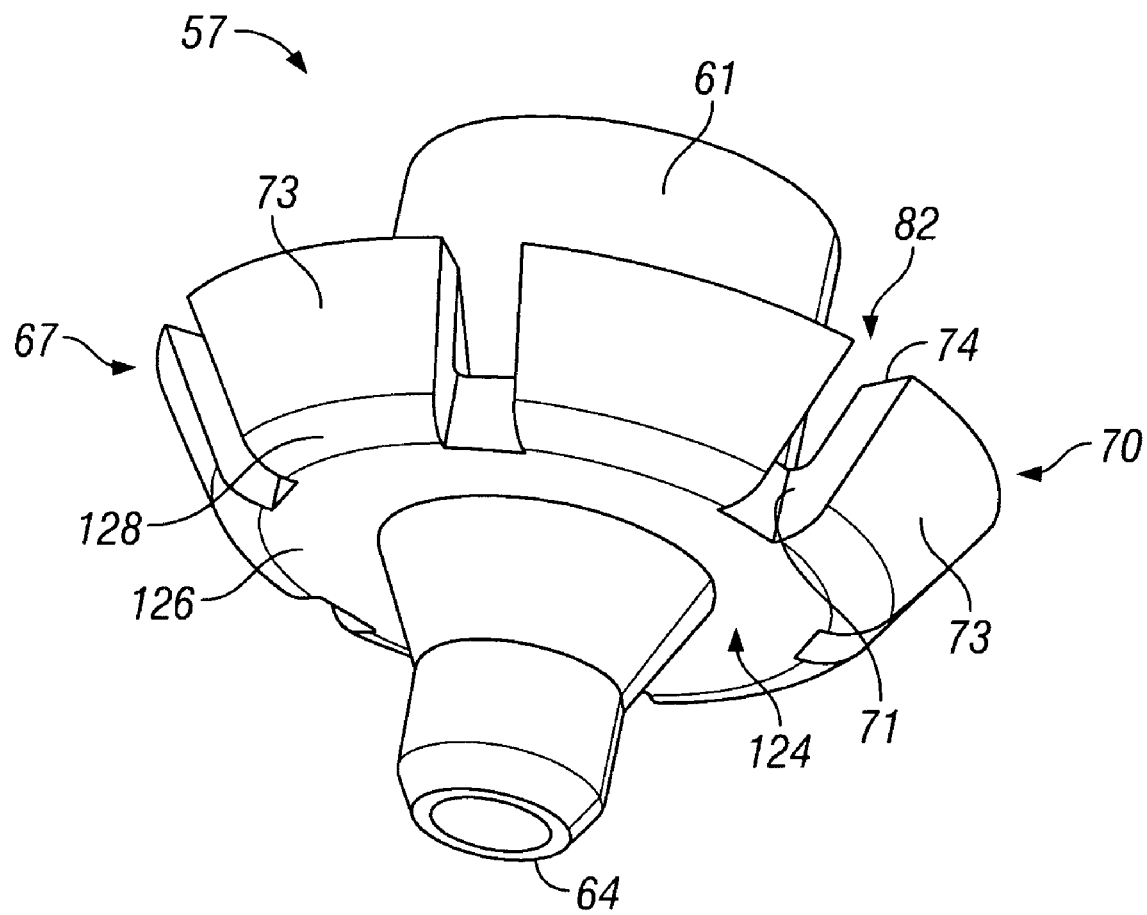
FIG. 6 is a bottom pictorial view of the truncated piston element shown in FIG. 5.
Figure 7:
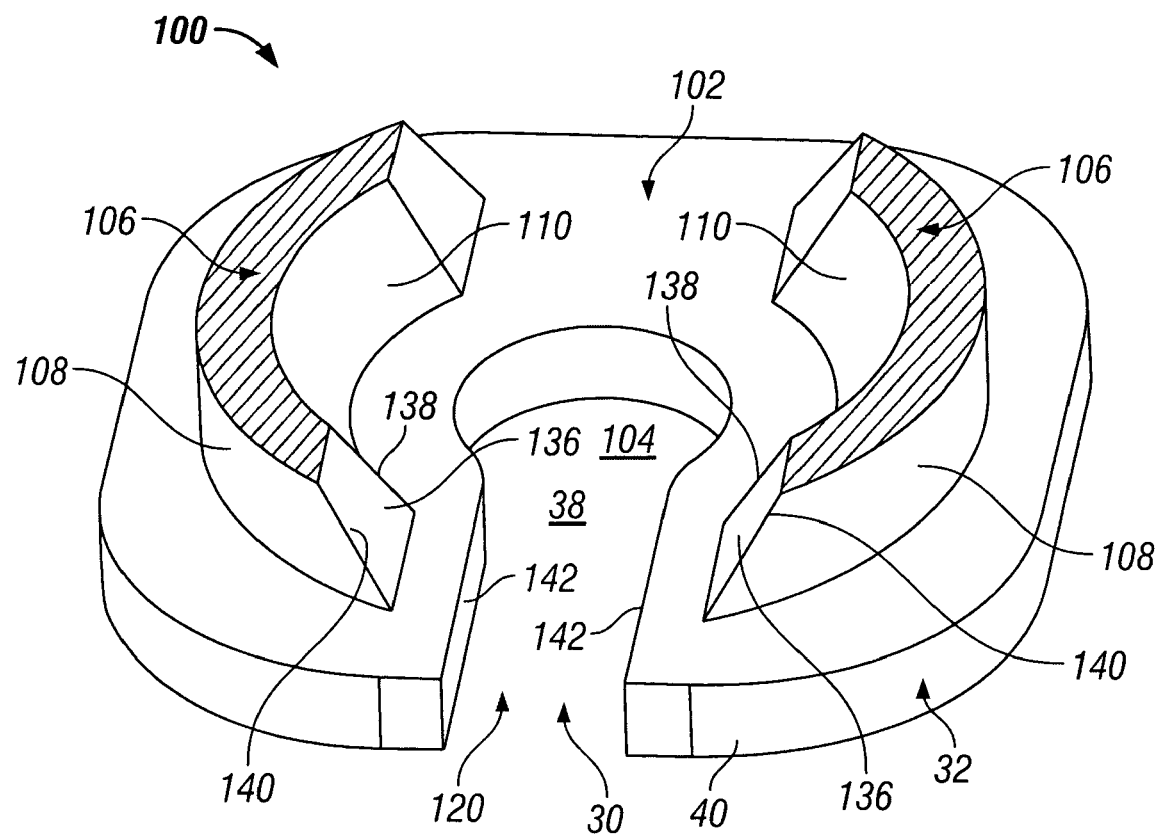
FIG. 7 is a top pictorial view of the central portion of the catch member shown in FIG. 5 but merely below section line 7-7' shown in FIG. 10.

The piston element 57 has on the stem 61 proximate its outermost end 64 a catch assembly comprising a resilient engagement member 67. The resilient engagement member 67 comprises a plurality of circumferentially spaced resilient finger members 70. As best seen in FIGS. 6 and 7, each of the finger members 70 is coupled to the stem 61 at a radially inner end 71 and extend radially outwardly and axially inwardly to a distal end 72. Each finger member 70 on the outer engagement flange 67 presents an axially outwardly and radially outwardly directed camming surface 73. Each finger member 70 has at its distal end 72 an inwardly directed shoulder 74. Each finger member 70 has an inherent bias to assume an extended position as seen in FIGS. 1 to 8 but to be deflectable to have its distal ends deflected radially inwardly as shown in FIG. 9.

As seen in FIGS. 2, 3, 5, 6, 9 and 12, the piston element 57 is to be engaged with the actuator plate 32 in a coupled orientation.

With the piston element 57 engaged with the actuator plate 32 in the coupled orientation as seen in FIG. 2, reciprocal movement of the actuator plate 32 between the extended position and the retracted position results in corresponding movement of the piston element 57 to dispense fluid from the reservoir.

Figure 5:
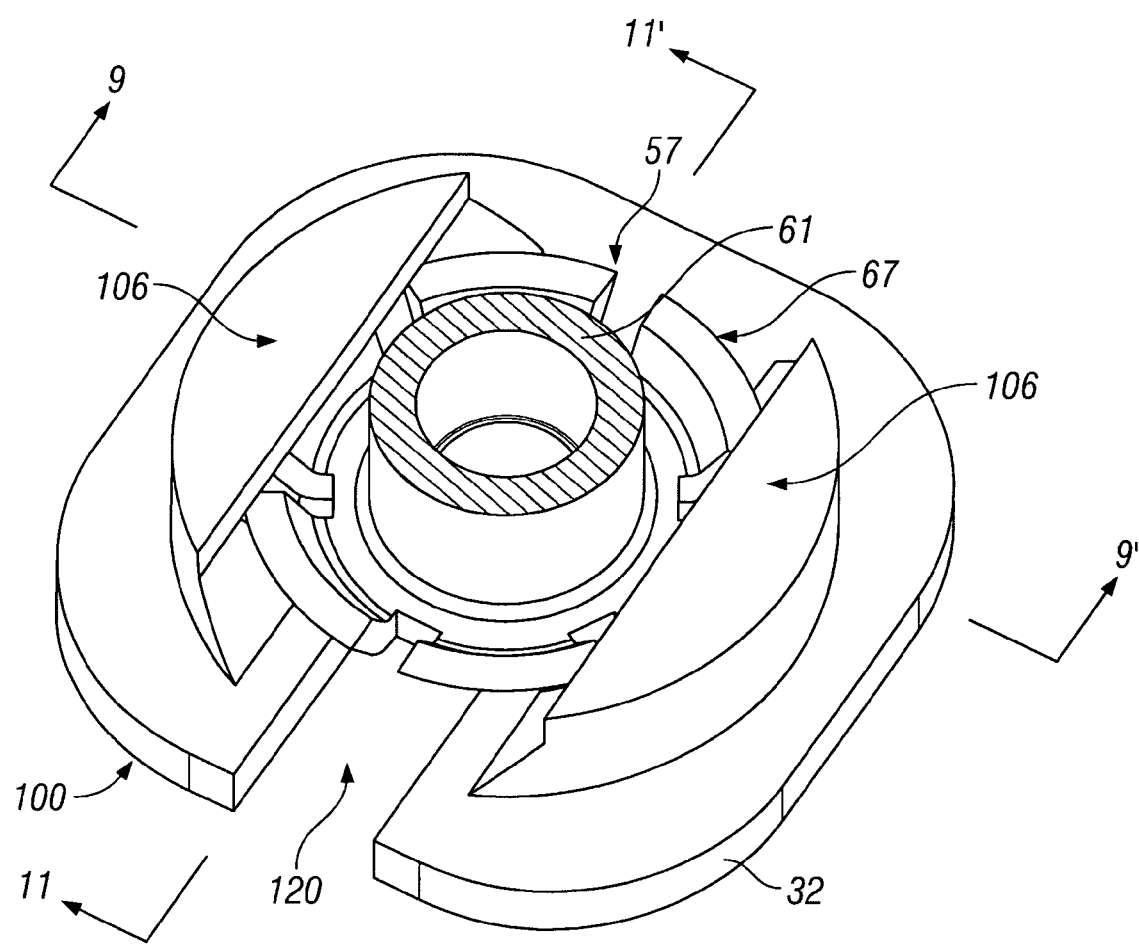
FIG. 5 is a schematic, cut-away partially cross-sectioned pictorial view of the piston element and actuator member shown in a coupled orientation in FIG. 3 with the piston element merely below section line 3-3' in FIG. 3 and merely schematically illustrating a central portion of the actuator plate within the dashed lines shown on FIG. 1.

Reference is made to FIG. 5 showing in an enlarged schematic view selected portions of the piston element 57 and the actuator plate 32. In FIG. 5, for convenience of illustration, merely portions of the piston element 57 and the actuator plate 32 are shown. In FIG. 5, merely a central portion of the actuator plate 32 indicated in FIG. 1 as within dashed lines 99 is shown schematically as a catch member generally indicated as 100. Similarly in FIG. 5, the piston element is shown merely below a horizontal cross-section indicated by section line 3-3' in FIG. 3 so the hollow stem 61 is shown cross-sectioned and truncated. Each of FIGS. 6 to 13 also only show the truncated catch member 57 and the central portion of the actuator plate 32 as in FIG. 5.

The catch member 100 serves to define a cavity 102 therein which is adapted to receive the forward portions of the piston element 57 and, most particularly, the engagement member 67. This cavity 102 includes coaxially therewith a central opening 104 through the actuator plate 32 disposed coaxially about the axis 66. A pair of upstanding catches 106 is provided on opposite sides of the opening 104 with each catch 106 having a side wall 108 with an interior surface 110 facing inwardly and defining the cavity radially therein. Each catch 106 has an inner end wall 112 which has an axially outwardly directed interior surface 114. The inner end wall 112 is axially spaced from the actuator plate 32 which forms, in effect, an outer end wall spaced axially from the inner end wall 112 and with such actuator plate/outer end wall 32 providing as the upper surface 36 of the actuator plate 32 an axially inwardly directed interior surface.

Figure 10:
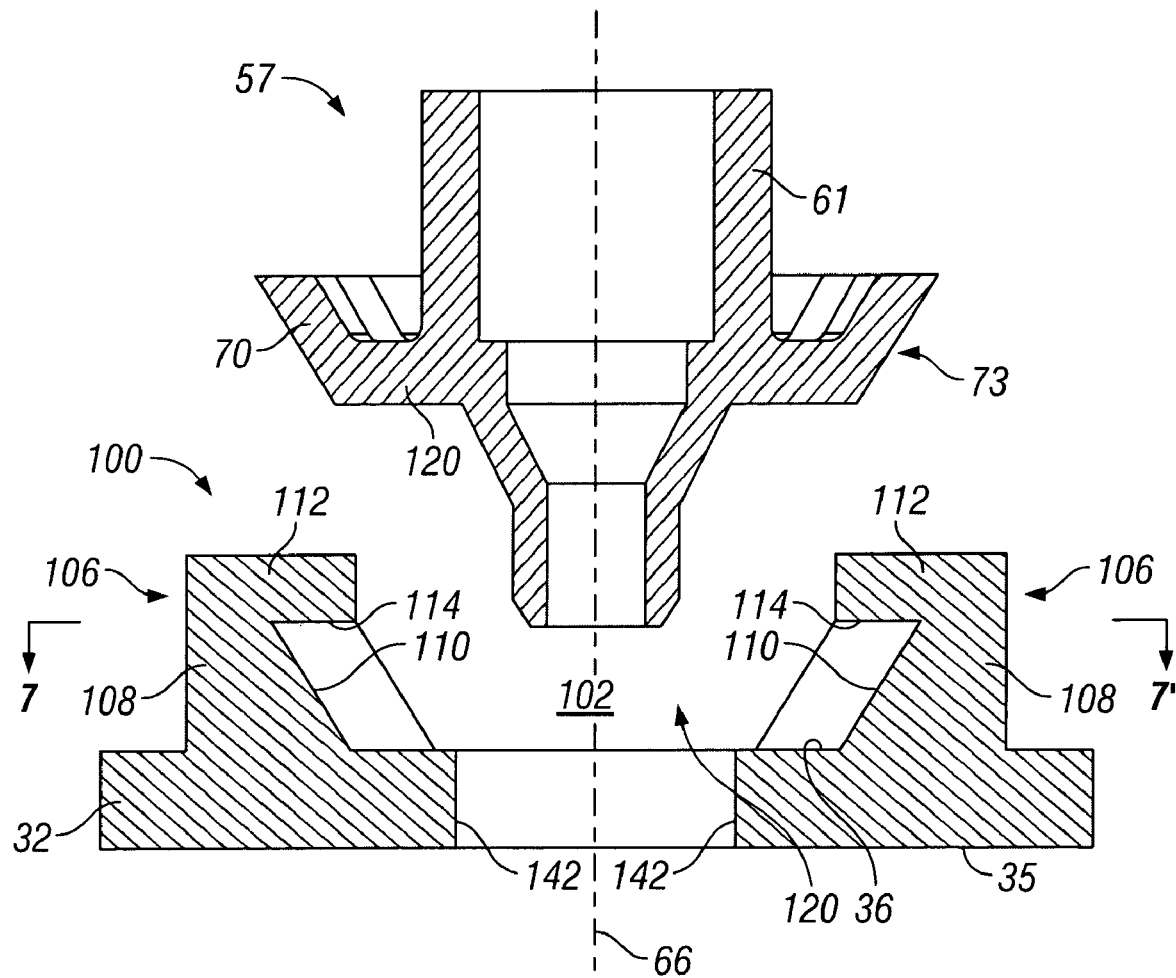
FIG. 10 is a cross-sectional side view the same as that in FIG. 9 along section line 9-9' in FIG. 6 but with the truncated piston element in an axial uncoupled orientation relative the central portion of the actuator plate.

As may be seen, for example, in the cross-sectional view of FIG. 10, the cavity 102 is defined radially between the interior surfaces 110 of the side walls 108 and axially between the interior surfaces 114 of the inner end wall 112 and the upper surface 36 of the outer end wall/actuator plate 32. As seen, for example, in FIG. 8, an exitway 120 is provided from the cavity 102 opening radially forwardly throughout its axially extent relative the axis 66 between the catches 106 through the inner end walls 112, between the side walls 108 and through the actuator plate/outer wall 32.

Figure 11:
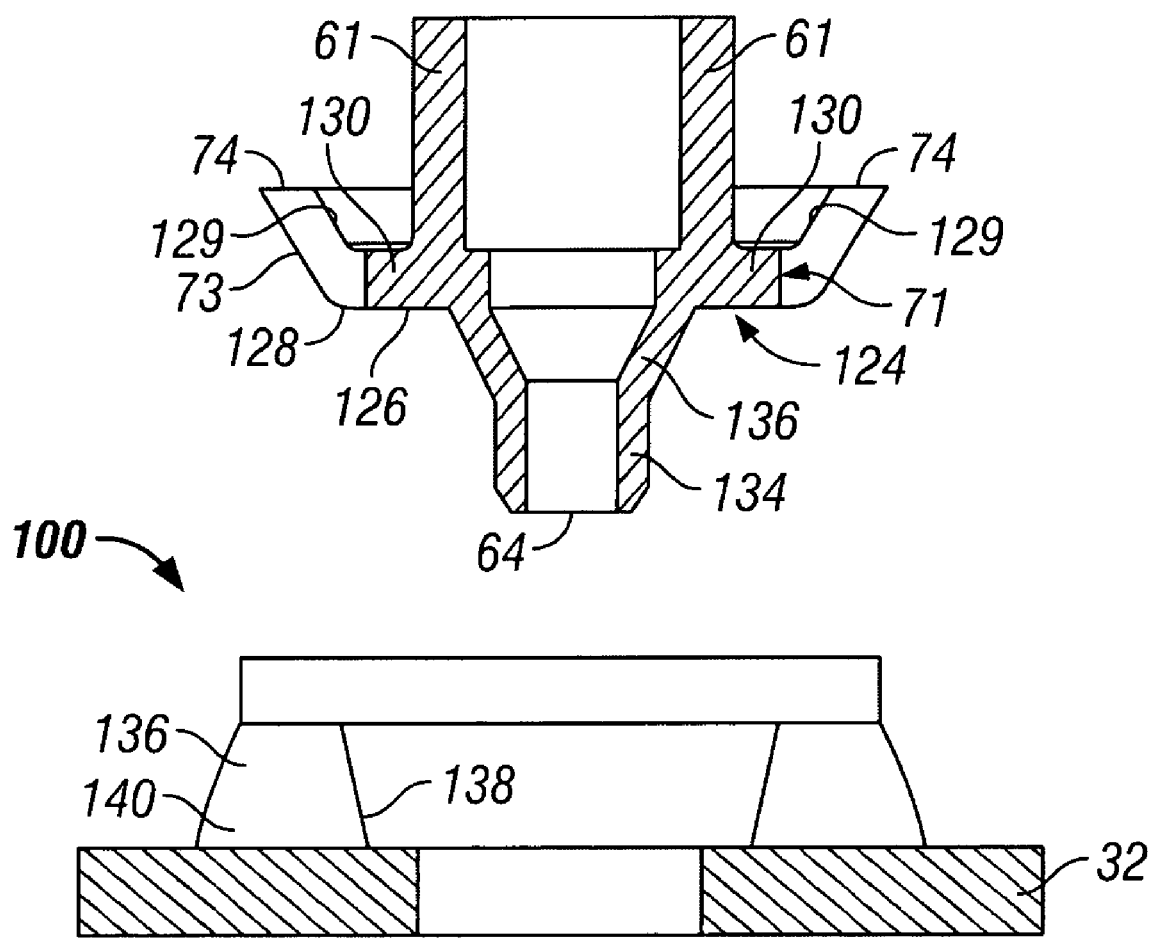
FIG. 11 is a cross-sectional side view similar to FIG. 10 but along a section line 11-11' in FIG. 5.

As may be seen, for example, from FIGS. 6, 10 and 11, the stem 61 has a radially outwardly extending annular flange 124 which carries finger members 70 at a radially outwardly directed end of the flange 124. The flange 124 is provided with a radially extending axially outwardly directed shoulder surface 126 which merges into an outer surface of the finger members firstly as a curved surface portion 128 which merges into a generally frustoconically disposed camming surface 73. The camming surface 73 ends at its inner end at the axially inwardly directed radially extending shoulders 74. The inner surface of the finger member 70 is shown to have a generally frustoconical portion 129 which merges at its lower end into an inner shoulder surface 130 on the flange 124.

Outwardly from the flange 124, the stem 61 extends axially forwardly as a frustoconical locating section 136 tapering outwardly and merging with a generally cylindrical outlet section 134 carrying the discharge outlet 64 at an axially outer end thereof.

The cavity 102 of the catch member 100 is provided to have a shape corresponding closely to the shape of the forward portions of the piston element 57 to be received therein. The interior upper surface 36 of the outer end wall 32 inside the cavity 102 closely corresponds to the size of the shoulder surface 126 of the flange 124 on the piston element 57. The interior surface 114 of the inner end wall 112 closely conforms to the shape and size of the shoulder 74 of the finger members 70 of the piston element.

As best seen in FIG. 7, the exitway 120 extends through the side walls 108 with the side walls 108 ending at a laterally directed cam surface 136 having an interior edge 138 and an exterior edge 140. Each of the frustoconical interior surfaces 110 of the side walls 108 ends forwardly at the interior edge 138.

Figure 8:
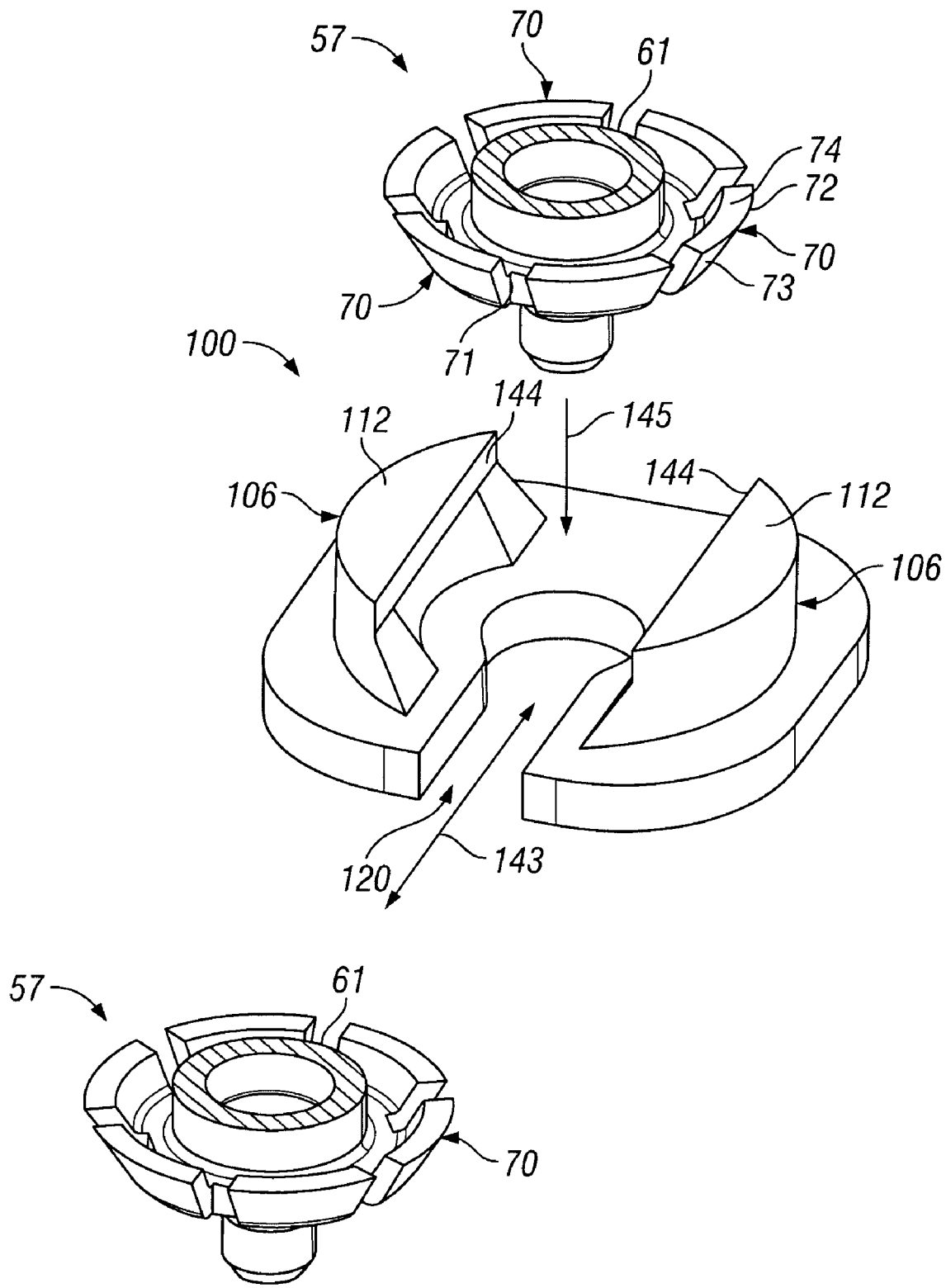
FIG. 8 illustrates the assembly shown in FIG. 5 with the truncated piston element shown twice, firstly in an axial uncoupled orientation relative to the central portion of the actuator plate and, secondly, in a radial uncoupled orientation.
Figure 9:
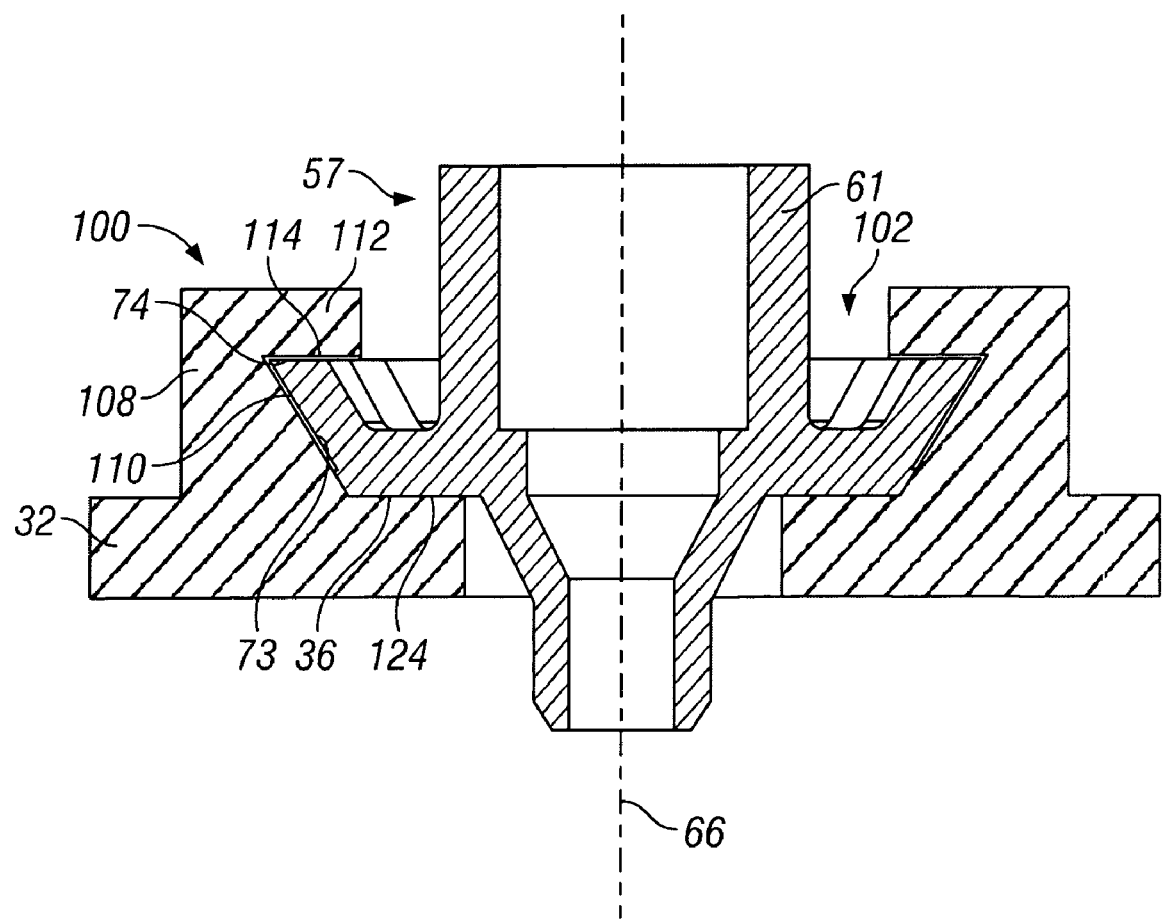
FIG. 9 is a vertical cross-sectional view along section line 9-9' in FIG. 5.

Reference is made to FIG. 8 which schematically shows the catch member 100 with the piston element 57 disposed in two different uncoupled orientations. Firstly, the piston element 57 is shown disposed forwardly of the catch member 100 in a radial uncoupled orientation from which radial uncoupled orientation the piston member 57 may be moved radially horizontally in the directions indicated by the arrow 142 from the radial uncoupled orientation into a coupled orientation and from the coupled orientation radially to the radial uncoupled orientation. FIG. 8 also shows the piston element 57 disposed in an axial uncoupled orientation from which by movement axially in the direction of the arrow 144 may be moved from the axial uncoupled orientation to the coupled orientation. The coupled orientation is shown, for example, in each of FIGS. 5, 9 and 12.

Figure 12:
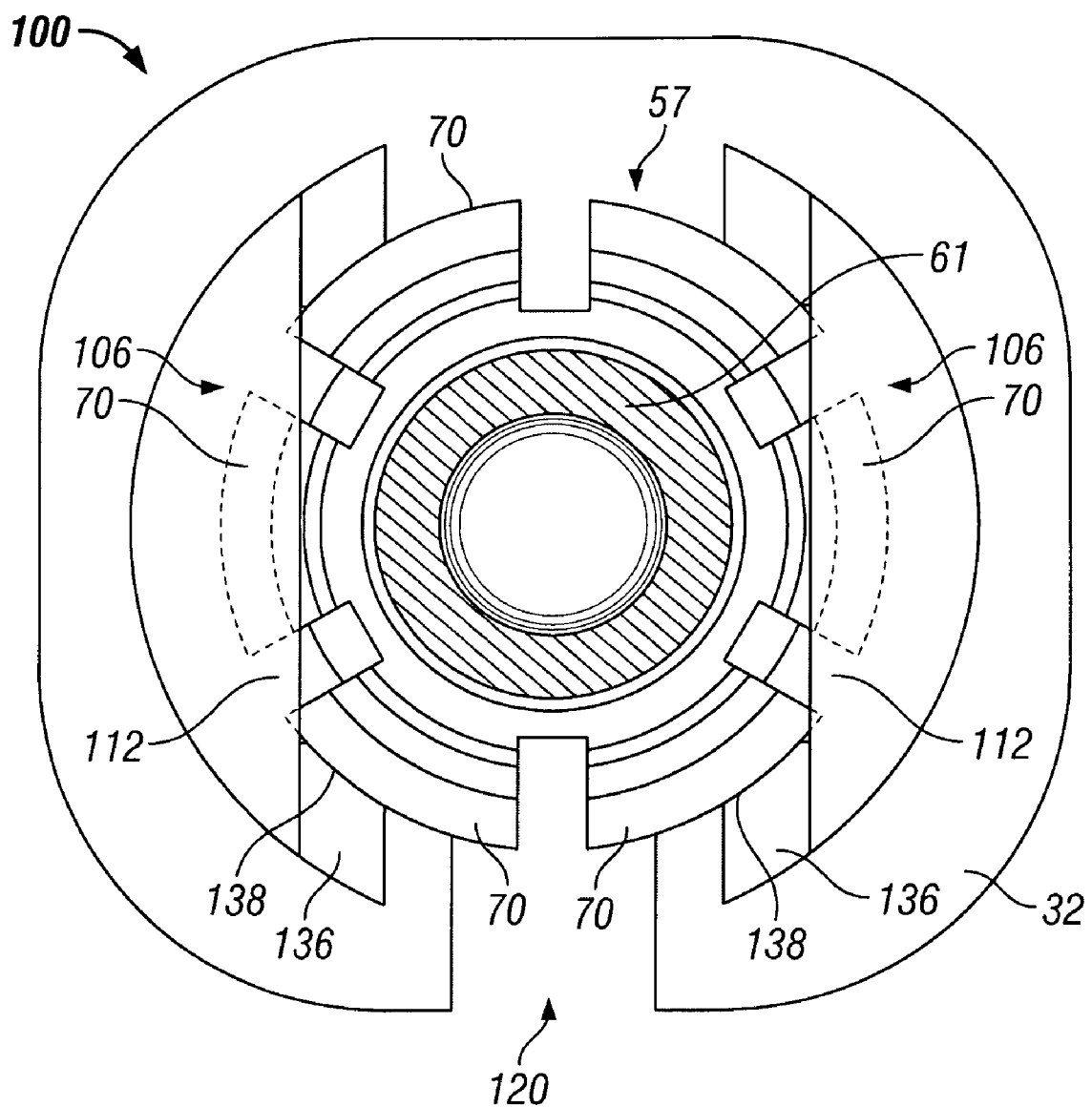
FIG. 12 is a cross-sectional top view of the assembly shown in FIG. 5 in the coupled orientation.
Figure 13:
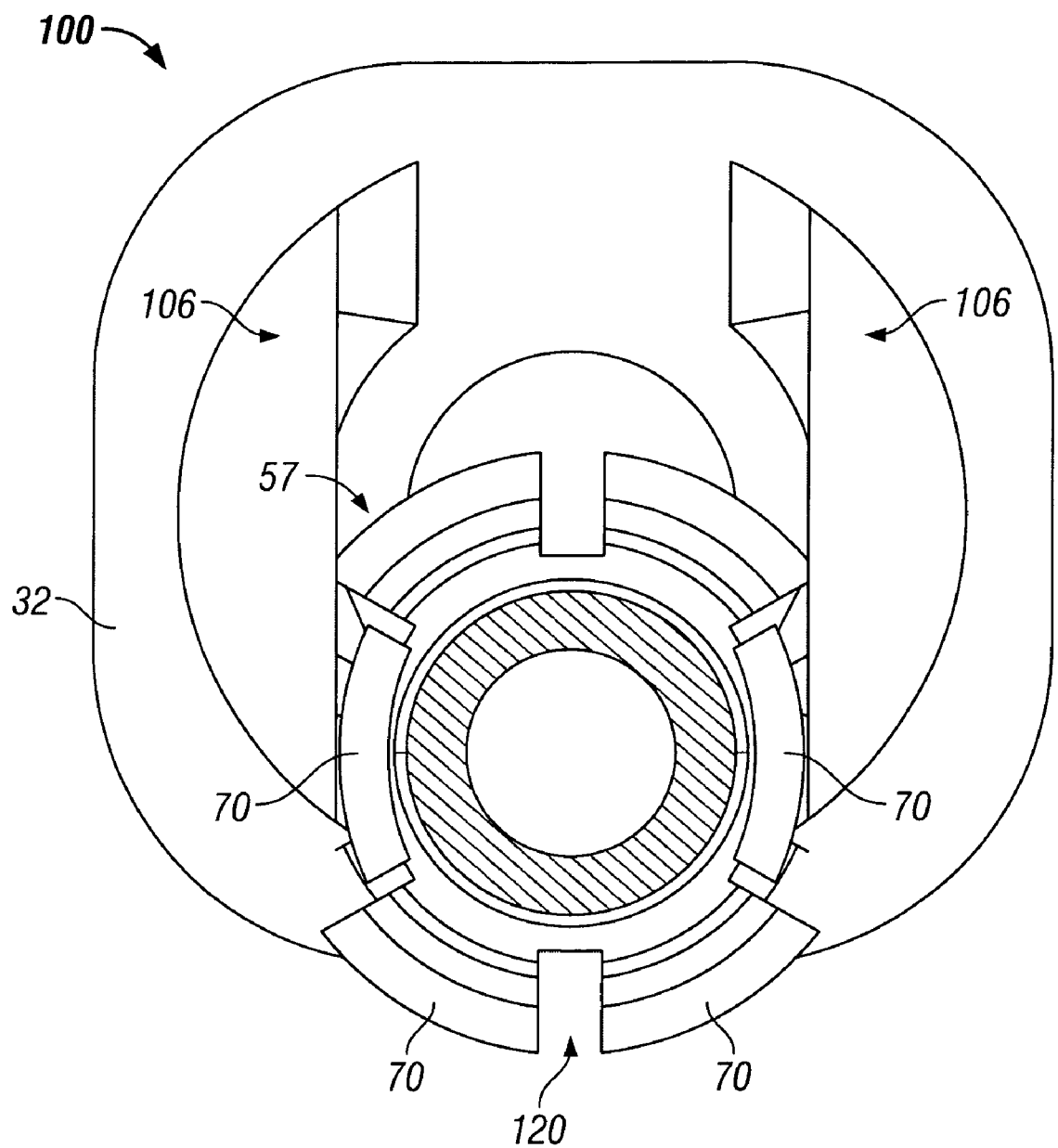
FIG. 13 is a top view the same as FIG. 12 but with the truncated piston element having been moved radially forwardly from the uncoupled orientation.

FIG. 12 shows a top view of FIG. 5 with the piston element 57 in the coupled orientation with the catch member 100. As can be seen in the dashed lines in FIG. 12, two of the finger members 70 are seen to underlie the inner end wall 112, with the shoulder 74 of the finger members 70 closely engaging the interior surface 114 of the upper end wall 112, as seen in FIG. 9 in cross-section with the camming surface 73 closely engaging the frustoconical interior surface 110 of the side walls 108 and with the flange 124 closely engaging the upper surface 36 of the outer end wall 32. From the coupled orientation, the piston element 57 may be removed from engagement with the catch member 100 by relative movement of the piston element 57 radially relative to the axis 66. In such radial movement, the camming surfaces 73 on the resilient fingers 70 engage the cam surfaces 136 and notably their interior edge 138 and as the piston element 57 is moved radially forwardly such engagement causes the resilient finger members 70 on opposite sides of the exitway 120 to be deflected radially inwardly so as to permit the deflected resilient fingers 70 to be moved radially through the exitway 120. FIG. 13 illustrates a condition in which the piston element 57 has been moved from a coupled orientation radially forwardly and two opposed finger members 70 adjacent each of the catches 106 has been deflected radially inwardly sufficiently that these finger members 70 may pass radially forwardly through the exitway 120.

In radial movement forwardly from the coupled orientation shown in FIG. 12 with the finger members 70 in an unbiased inherent configuration, the finger members 70 come to be deflected to deflected configurations of different radial extents than the inherent configuration. From such deflected configurations, each of the finger members 70, due to its inherent resiliency are biased to return to the inherent configuration. From the coupled configuration shown in FIG. 12, on initial moving radially forwardly, the engagement of the forwardmost portions of the frustoconical interior surfaces 110 of the side walls 108 will assist in urging the finger members 70 radially inwardly at least during initial radial movement of the piston element 57. After initial movement, engagement between the camming surface 73 on the finger members 70 and the interior edges 138 of the camming surfaces 136 will cause additional deflection of the finger members 70 and as the piston member 57 moves further outwardly, the camming surface 73 of the finger members 70 will come to ride on the camming surface 136 and on later exiting the entranceway 120 will come to ride and engage on the exterior edges 140 of the camming surface 136.

The exitway 120 is defined by a slotway 38 through the outer end wall 32 from the front edge 40 of the actuator plate 32 into the central opening 104. The slotway 38 has side walls 142 which are spaced sufficiently such that they do permit passage of the frustoconical locating section 136 and the cylindrical outlet section 134 of the piston element 57 radially therethrough. Similarly, as shown, side wall surfaces 144 of the exitway 120 carried on the inner end walls 112 are spaced a sufficient distance radially that they permit the movement of the stem 61 radially forwardly therethrough. From the radially uncoupled orientation shown in FIG. 8, the piston element 57 may be moved radially rearwardly to the coupled orientation. In such radial inward movement, the cam surface 136 of the side walls 108 on either side of the exitway 120 engage the camming surface 73 on the finger members 70 to deflect the finger member 70 radially inwardly such that as seen in FIG. 13, opposed finger members 70 are disposed radially inwardly sufficiently that they may move inwardly past the camming surfaces 136 and into the cavity 102. As the piston element 57 moves from the position of FIG. 13 towards a coaxial position within the cavity, the finger members 70 due to their inherent resiliency assume their unbiased inherent configuration. In one sense, therefore, on radial movement of the piston element 57 from the uncoupled orientation to the coupled orientation, the finger members 70 are deflected to the deflected configurations and subsequently snap back to assume their inherent configuration.

The piston element 57 in a coupled orientation resists movement from the coupled orientation firstly, in an axial direction by reason of the shoulders 74 of the finger members 70 engaging the interior surfaces 114 of inner end walls 112, the shoulder surface 126 of the flange 124 engaging the upper surface 36 of outer end wall 32, as well as the camming surfaces 73 of the fingers 70 engaging the interior surfaces 110 of the side walls 108. In a coupled orientation, movement of the piston element 57 radially relative to the catch member 100 is resisted by the finger members 70 in the inherent configuration engaging the interior surfaces 110 of the side walls 108.

Having regard to FIG. 8, the piston element 57 may also be moved from the axially uncoupled orientation shown in FIG. 8 to the coupled orientation by relative axial movement. On such axial movement, the camming surfaces 73 on the finger members 70 come to engage the side wall surfaces 144 of the inner end wall 112 so as to deflect the finger members 70 from their unbiased inherent configuration to deflected configurations of different radial extents than the inherent configuration permitting the finger members 70 to pass axially past the inner end wall 112 with the cylindrical outlet section 134 and the frustoconical locating portion 136 of the piston element to extend coaxially downwardly into the central opening 104 of the outer wall 32. In such axial insertion, the piston element 57 may be considered to move downwardly through an axially extending entranceway bordered by the side wall surfaces 144 of the inner end wall 112. Finger members which are deflected to deflected configurations on movement between the side wall surfaces 144 of the inner end wall 112 will snap back to assume their inherent configuration once the camming surface 73 on the finger members 70 passes axially outwardly below the axially outwardly directed interior surface 114 of the inner end wall 112. As seen in FIG. 9 in the coupled orientation, the cavity 102 is formed to have interior surfaces including the entire interior surface 114 of the inner end wall 112, the entire interior surface 110 of the side wall 108 and portions of the interior surface 36 of the outer end wall 32 to be coaxially about the axis and forming, in effect, keyway portions which lie in a first rotational surface defined by rotation of a corresponding first shape about the axis 66. Similarly, key portions of the exterior surface of the piston element 67 may be considered to lie in a second rotational surface defined by rotation about the axis 66, when the piston member is coaxial about the axis 66, of a second shape substantially having the same shape as the first shape. Providing the cavity 102 to have keyway portions corresponding in shape to the key portions of the exterior surfaces of the piston element 57 is considered advantageous to limit insertion into the chamber 102 of piston elements which do not have a rotational shape falling within the confines of a shape defined by the keyway portions.

The preferred embodiment illustrated shows the resilient engagement flange 67 as comprising a plurality of discrete circumferentially spaced finger members. This is not necessary. For example, rather than have separate finger members 70 with slots 82 separating the finger members, the finger members could be replaced by a continuous annular member, however, with such member having a resiliency which permits radial deflection to suitable deflected configurations.

The cavity 102 and the portions of the piston element 57 to be received within the cavity 102 effectively forms a three-dimensional keyway and a complementary key with entrance or exit to the keyway requiring deflection of resilient portions. It is to be appreciated that such entrance or exit to the keywall could also be accommodated by deflection of the key, by deflection of the keyway or by deflection of both the keyway and the key. With the keyway portions of the catch member 100 and key portions of the piston element 57 each being defined by rotational surfaces rotated about the axis 66, the piston element 57 may in any relative position rotated about the axis 66 be engaged within the cavity 102. This is preferred, however, not necessary and various arrangements may be provided so as to require for proper insertion of the piston element 57 into the cavity 102 that the piston element 57 be rotated about the axis 66 to one or more desired rotational positions.

FIG. 1 is intended to illustrate the reservoir assembly including the reservoir 16 and the valve assembly 22 in a radial uncoupled orientation ready for coupling to the housing 14 by merely radial rearward movement. From the position shown in FIG. 1, initial horizontal rearward sliding of the entirety of the reservoir 12 will result in the flange 24 of the housing 14 to be received in the slotway 52 between the lowermost wall 17 of the fluid chamber 16 and the upwardly directed shoulder. With the piston element 57 located in a suitably extended position relative the piston chamber forming member 56, the piston element 57 and the catch member 100 will be in a radial uncoupled orientation, from which by continued further horizontal rearward sliding of the reservoir 12 and valve assembly 22, the piston element 56 may have its fingers 70 deflected and enter the cavity 102 to assume the coupled orientation.

Figure 4:
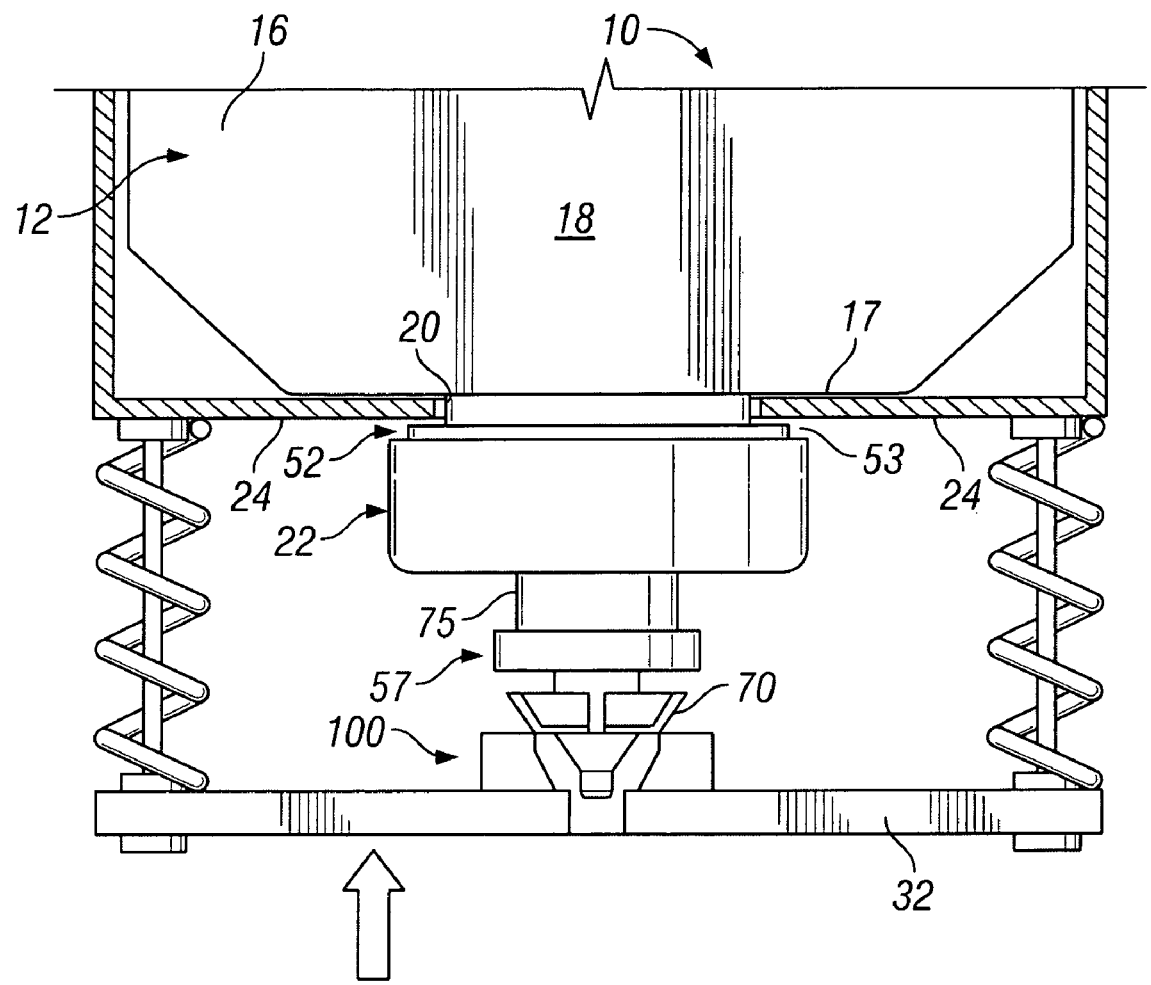
FIG. 4 is a front view housing and reservoir similar to FIG. 3 but with the piston element in an axial uncoupled orientation above the actuator assembly and with the actuator assembly moved from the fully extended rest position partially towards the fully retracted position to engage the piston element.

Reference is made to FIG. 4 which illustrates a situation which arises when the reservoir 12 is in inserted into the housing 14 by horizontal rearward sliding with the piston element 57 in a fully retracted position. The flange 24 of the housing is received in the slotway 52 between the lowermost wall 17 and the upwardly directed shoulder 53 of the valve assembly 22. However, with the piston element 57 in the retracted position, the finger members 70 of the engagement member 67 of the piston element 57 are disposed in the axial uncoupled orientation vertically above the catch member 100 carried by the actuator plate 32. From the position of FIG. 4, in first operation of the dispenser, that is, as by manual movement of the lever 31, the actuator plate 32 is moved from its position below the outer engagement member 67 vertically upwardly as indicated by the arrow in FIG. 4. The catch member 100 engages the resilient finger members 70 of the engagement member 67, and with such engagement, the resilient finger members 70 are deflected radially inwardly permitting the piston element 57 to enter and be engaged in the catch member 100 adopting the coupled configuration.

In the actuator plate 32 moving upwardly as illustrated by the arrow in FIG. 4, the catch member 100 on first engagement with the finger members 70 will urge the piston element 57 upwardly, as possible, to place the piston element 57 in a fully retracted position in which upward movement of the piston element 57 relative to the piston chamber forming member 56 is prevented as by an inner end of the piston element 57 engaging the inner end of the chamber 58 in the piston chamber forming member 56.

With the piston element 57 in the coupled orientation coupled to the actuator plate 32, in a cycle of operation after manual release of the lever 31, the springs 33 will return the actuator plate 32 and the piston element 57 together to the extended position.

Reference is made to FIG. 6 which best shows the resilient finger members 70. In the preferred first embodiment, six finger members 70 are provided each representing an equal segment about the central axis 66 through the piston element 57 and each disposed uniformly spaced from each other by a slot 82.

The slot 82 is of a circumferential extent that the distal end 72 of each finger member 70 may be deflected radially a sufficient extent for the finger members 70 to pass through the exitway 120 without circumferential side portions of the distal ends 72 of adjacent finger members 70 engaging. Providing the finger members 70 to extend circumferentially about the outer end of the piston element 57 permits the piston element 57 to have fingers 70 which will engage with the catch member 100 irrespective of the relative rotational position of the piston element 57 within the piston chamber forming member 56.

In the preferred embodiments illustrated, for example, in FIG. 1, the piston element 57 is preferably injection moulded from a plastic material as a unitary element. The entirety of the reservoir 12 and its pump assembly 22 is preferably disposable as a unit after the contents of the reservoir have been dispensed. The resilient fingers 70 of the piston element 57 therefore merely need to have resiliency which permits coupling with the actuator plate 32 once or at least not more than a few times since an individual reservoir 22 with its disposable pump assembly 22 is typically only expected to be coupled to the housing a single time. Thus, the plastic materials from which the resilient fingers 70 are constructed need not be capable of being deflected any significant number of times and still retain their resiliency. Thus, the resilient fingers 70 may be formed from a relatively inexpensive plastic material which, while having some inherent resiliency, need not maintain that resiliency over repeated cycles of deflection. The piston element 57 or at least substantial portions thereof including the engagement member 67 which carries the resilient fingers 70 may preferably be formed as a substantially unitary element from plastic material as by injection moulding.

In the embodiment of FIG. 1, the piston element 57 permits the sliding insertion of the reciprocally movable piston element 57 into the catch member 100 on the actuator plate 32 either into a coupled orientation as shown in FIG. 2 or an axial uncoupled orientation where the piston element may move independently from the actuator plate 32 as shown in FIG. 4.

In the coupled orientation, the pivotal movement of the lever 31 axially moves the catch plate 32 and piston element 57 between the first rest, extended position and the second fully retracted position to dispense a quantity of fluid 18. If the reservoir 12 is inserted with the piston element 57 in the axial uncoupled orientation of FIG. 4, the first movement of the lever 31 moves the actuator plate 32 relative to the piston element 57 until the piston element 57 engages the catch member 100 and assumes the coupled orientation of FIG. 2. In this manner, the dispenser 10 is operative to dispense fluid 18 regardless of whether the piston element 57 is initially inserted into the housing 14 either coupled or uncoupled to the actuator plate 32.

To dispense fluid 18, the actuator assembly 30 is cycled by the pivotal movement of the lever 31 moving the piston element 57 from the first rest, extended position shown in FIG. 2 to a retracted position and released with the springs 34 returning the actuator plate 32 back to the first rest, extended position to complete the cycle.

The dispenser 10 of the present invention advantageously permits insertion of the reservoir 12 into the housing without the requirement of ensuring the piston element 57 is in a particular position relative to its piston chamber forming member 57 or the catch plate 32.

Reference is made to FIGS. 14 to 17 which show a second embodiment of a catch member 100 and a forward truncated portion of a piston element 57 for engagement therein. In FIGS. 14 to 17, similar reference numerals are used to refer to equivalent elements shown in FIGS. 1 to 13. In the first embodiment of FIGS. 1 to 13, the piston element 57 carried the discharge outlet 64 from which fluid may be discharged for use onto a user's hand. In the embodiment of FIGS. 14 to 17, a fluid outlet 64 from the piston element 57 is in sealed communication with a discharge passageway 202 through the catch member 100 with a discharge outlet 214 being carried by the catch member 100. In the embodiment of FIGS. 14 to 17, the piston element 57 similarly has an elongate hollow tubular stem 61 with a passageway 65 therethrough which has at its distal end the outer shoulder surface 128 on the flange 126. Axially outwardly of the flange 126, in the upper surface 36 of the outer end wall 32 of the catch member an annular slotway 204 is provided to receive an annular sealing ring 206 which is adapted to be engaged and compressed by the flange 124 of the piston member 57 forming a seal annularly thereabout when the piston element 57 is in the coupled orientation. The catch member 100 is provided with a hollow discharge tube 208 open at an upper end 210 which is coaxial with and in communication with the discharge outlet 64 from the piston member 57. The discharge tube 208 is open at an outer end 212 forming a discharge outlet 214.

Figure 14:
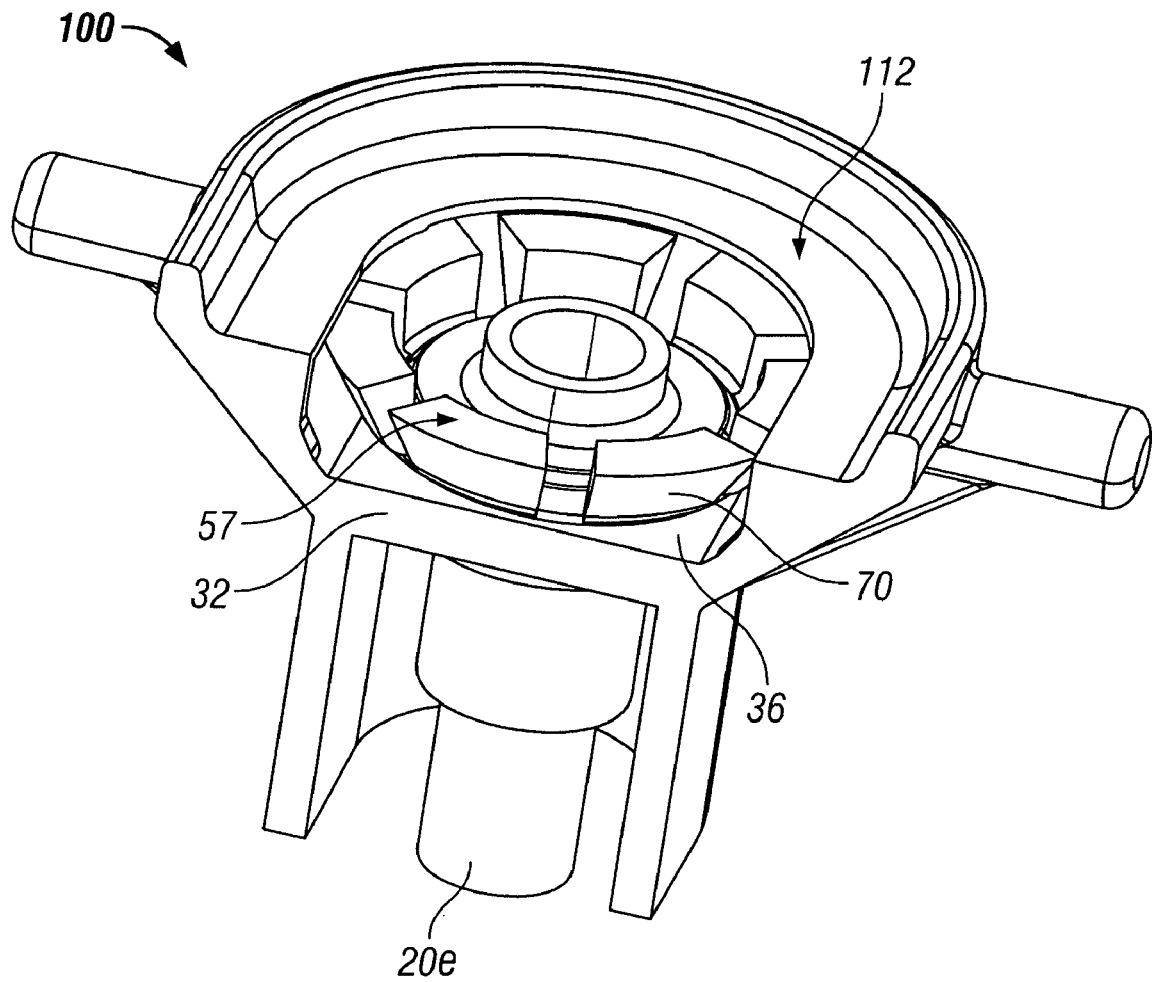
FIG. 14 is a schematic pictorial view of a catch member and lower portion of a truncated piston element in accordance with a second embodiment of the present invention in a coupled orientation.

As seen in FIG. 14, the inner end wall 112 of the catch member 100 extends circumferentially about the axis 66 greater than 180 degrees and is U-shaped opening radially forwardly.

Figure 15:
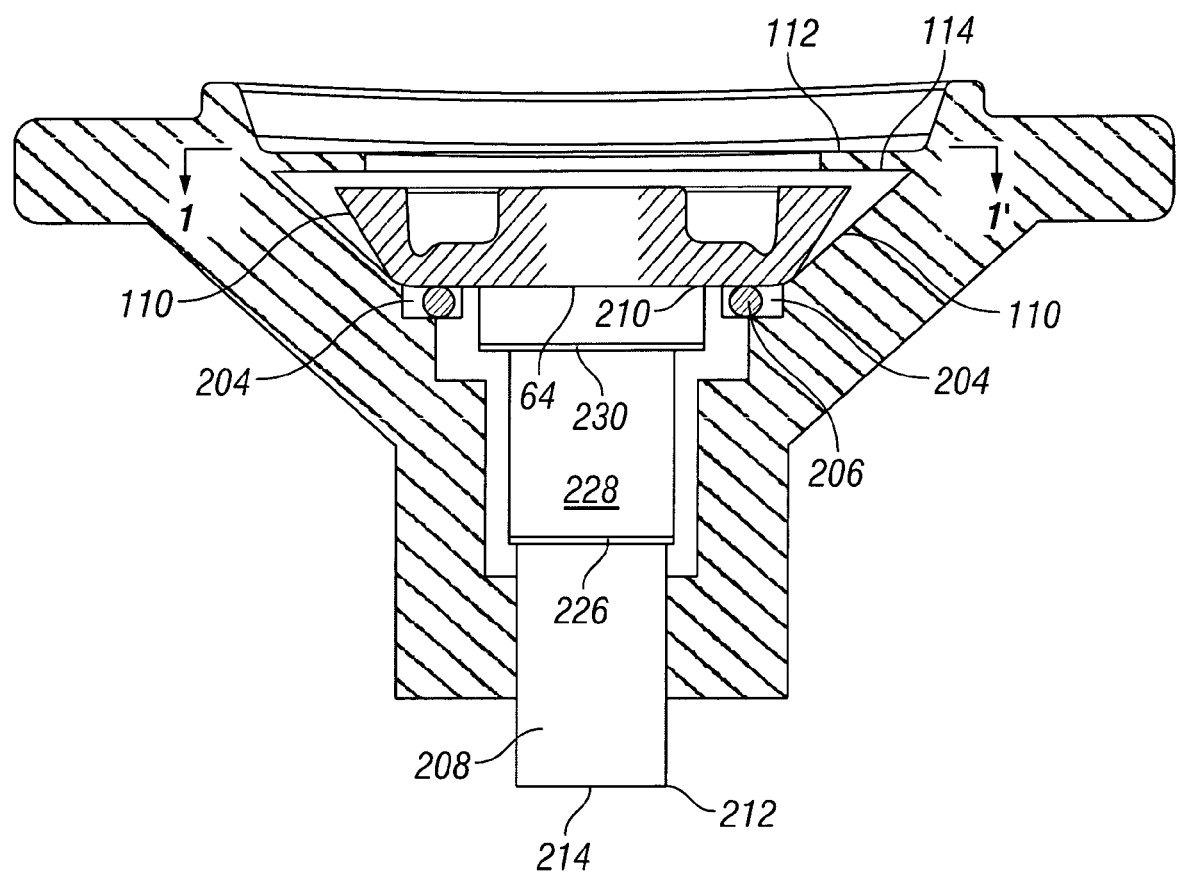
FIG. 15 is a diametric side-to-side cross-sectional view of the assembly shown in FIG. 14.
Figure 16:
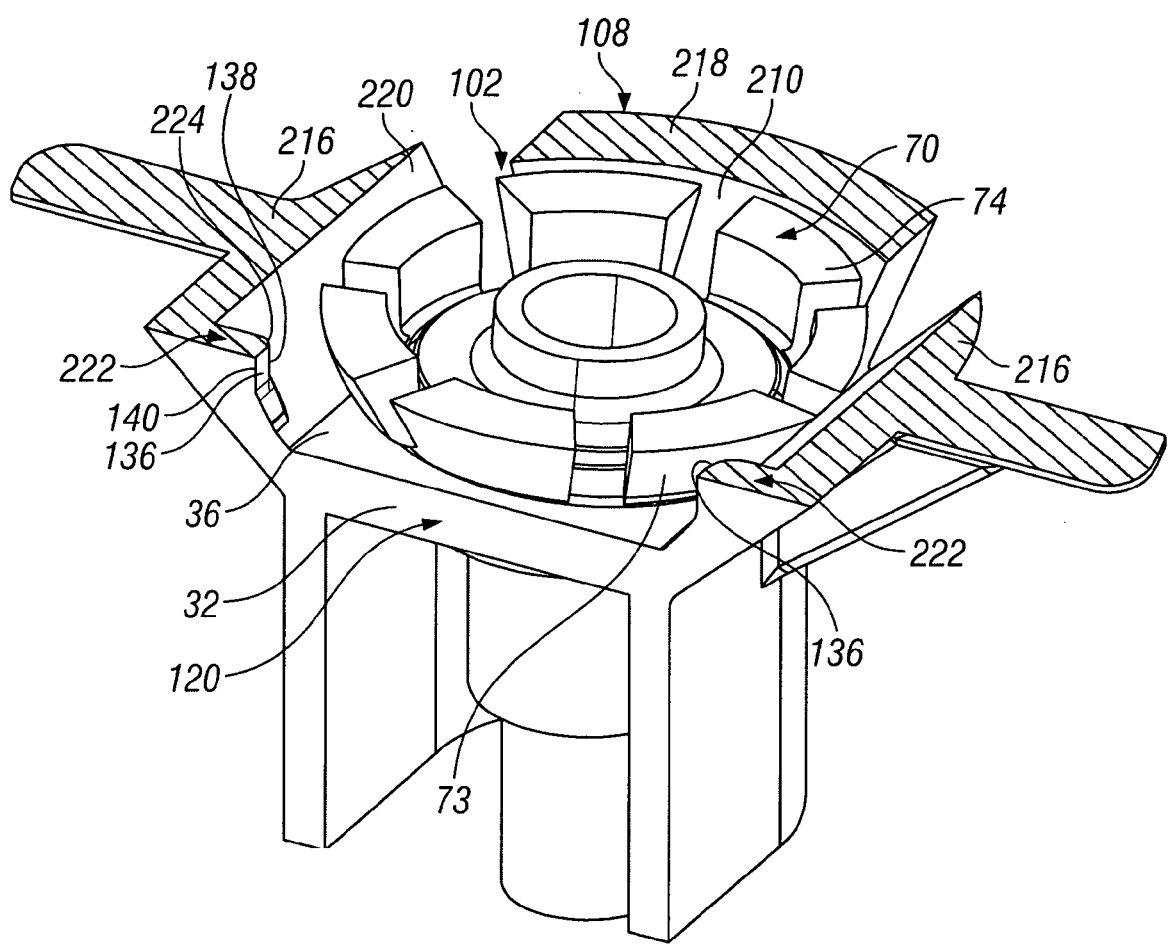
FIG. 16 is a perspective view of the assembly shown in FIG. 15 below a horizontal cross-section indicated as 1-1' in FIG. 15.

FIG. 16 shows a pictorial view similar to FIG. 14, however, with the catch member 100 and piston element 57 shown merely below a horizontal cross-sectional line 1-1' in FIG. 15 slightly above the shoulder 74 of the finger members 70. As can be seen in FIG. 16, the side wall 108 is provided as three portions including, in addition to two opposing side portions 216, a rear portion 218. The interior surface 110 of the rear portion 218 of the side wall 108 is frustoconical and generally conforming to the shape of the exterior frustoconical camming surfaces 73 of the finger members 70. The side portions 216 of the side wall 108 include a major sloped surface 220 shown to be generally planar lying in a flat plane disposed at an angle to the axis 66 and tapering downwardly and radially inwardly towards the axis 66. At a forward end of each such sloped surface 220, there is provided on each side wall portion 216 a stop member 222 which projects into the cavity 102 relative the sloped surface 220. Each stop member 222 carries the cam surface 136 directed in opposition to a cam surface 136 on the opposite stop member. Each cam surface 136 has an exterior edge 140 and an interior edge 138. The interior edge 138 merges with a beveled cam surface 224 directed inwardly into the cavity. As with the first embodiment, on sliding the piston element 57 radially forwardly from a coupled orientation, engagement in succession of the beveled cam surfaces 224, the exterior edges 140 and the cam surfaces 136 with the camming surfaces 73 on the finger members 70, deflect the finger members 70 radially inwardly to reduce the radial width of the piston element 57 between finger members 70 permitting the finger members 70 to pass radially forwardly through the exitway 120. As with the first embodiment, the piston element 57 may be moved from a coupled orientation to a radial uncoupled orientation or from the radial uncoupled orientation to a coupled orientation by movement radially. As well, the piston element 57 may move from an axial uncoupled orientation to a coupled orientation by movement axially.

Figure 17:
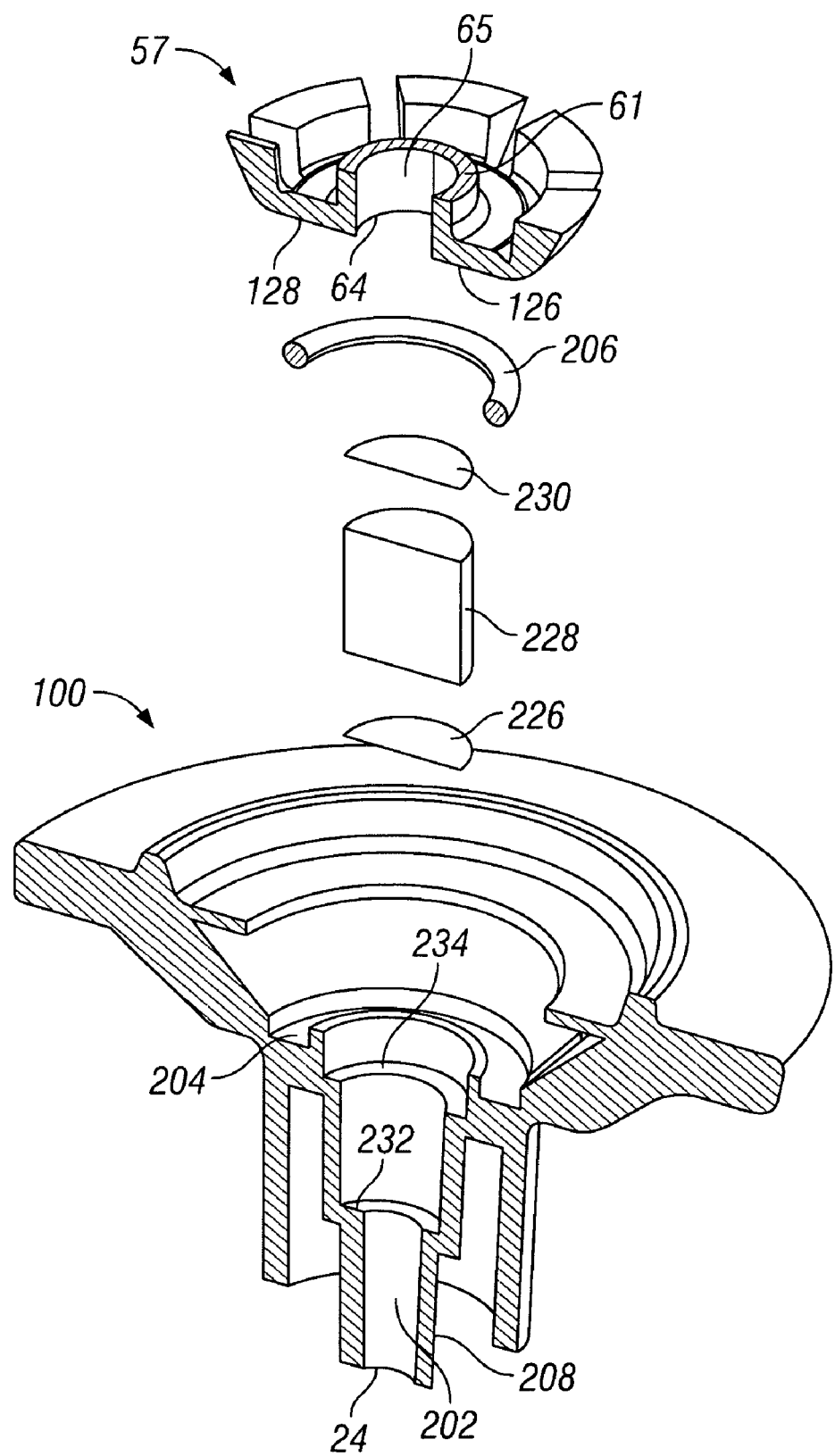
FIG. 17 is a pictorial exploded view of the assembly of FIG. 14 cross-sectioned along the same side-to-side diametric cross-section as in FIG. 15.

FIGS. 15 and 17 illustrate components carried in the discharge tube 208 of the catch member 100 which provide a foam generator assembly for foaming of a mixture of liquid and air which may be discharged from the piston element 57 assuming the piston element may, for example, be of the type disclosed in U.S. Pat. No 6,409,050 to Ophardt. In this regard, the discharge tube 208 has a stepped configuration adapted to assist in receiving and holding at axially spaced locations a first screen member 226, a porous plug 228 and a second screen member 230. As seen, the first screen member 226 is to sit on a first stepped shoulder 232 with the cylindrical foam plug to sit on top of the first screen member 226 and with the second screen member 230 is to sit on a second stepped shoulder 234.

Figure 18:
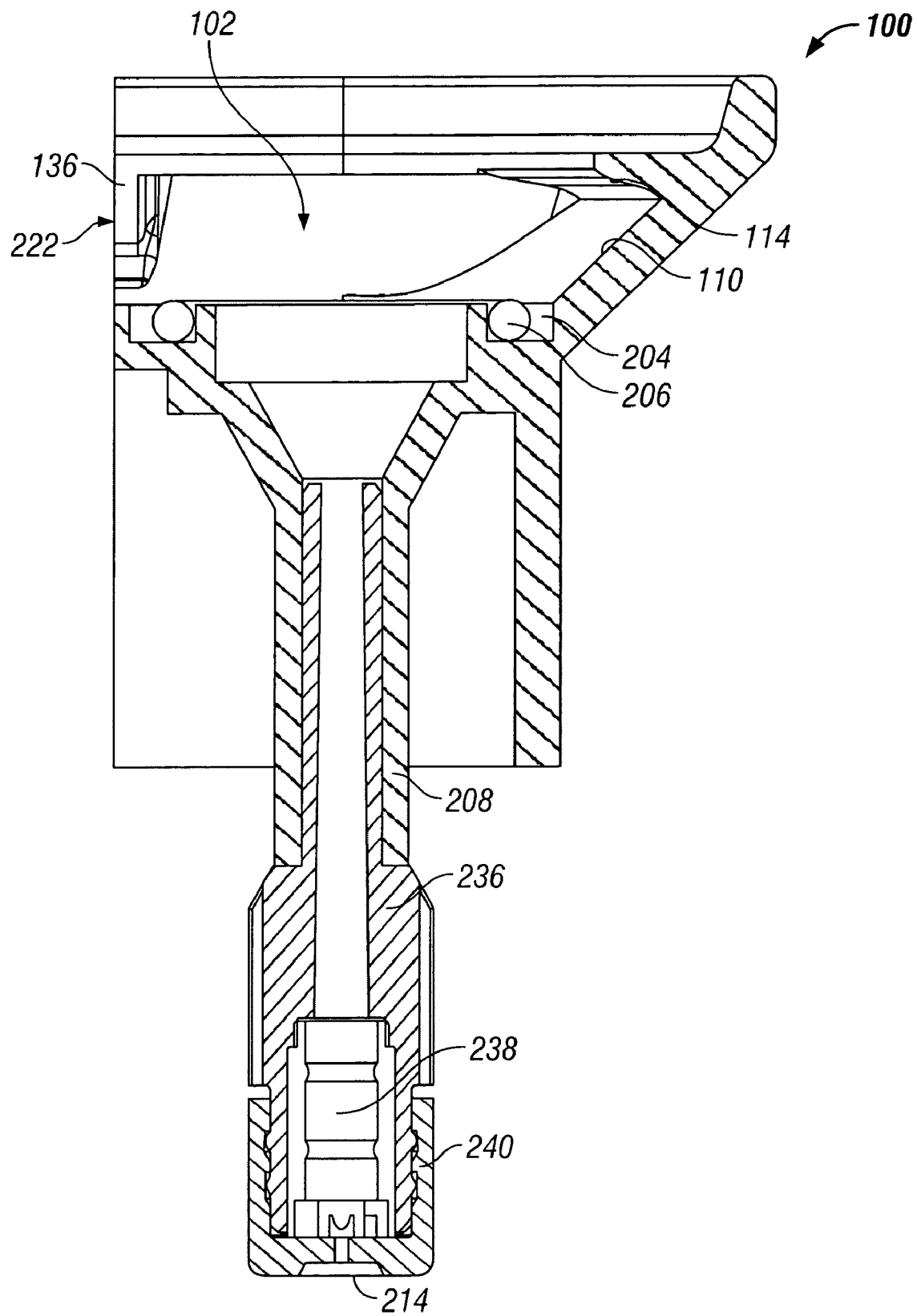
FIG. 18 is a diametric cross-sectional front-to-back side view of the assembly shown in FIG. 14, however, including a spray nozzle attachment.

Reference is made to FIG. 18 which illustrates the catch member 100 of FIG. 14 in cross-section along section line 3-3' in FIG. 15 without showing the piston member 57. The catch member 100 in FIG. 18 is identical to the catch member 100 illustrated in FIGS. 14 to 17 with the exception that below the sealing ring 206, the discharge tube 208 has been changed with the screen members 226 and 230 and the plug 228 removed, and a spray nozzle assembly has been provided coupled to the discharge tube 208 including a tubular nozzle extension 236, a restrictive nozzle insert 238 and a nozzle end cap 240. In a known manner, the nozzle end cap 240 is secured in a snap or threaded fit onto the end of the nozzle insert 238 and provides a small discharge opening therethrough. The nozzle insert 238 provides relatively small passages for passage of fluid therethrough such that fluid dispensed from the discharge outlet 214 of the nozzle cap 240 will be in the form of a fine mist or atomized spray.

In the second embodiment of FIGS. 14 to 18, providing the discharge tube 208 as part of the catch member 100 assists in reducing the overall length of the piston element 57 which needs to be carried by the assembly of the reservoir 12 and the valve assembly 22. Providing the discharge tube 208 on the catch member 100 assists in extending the discharge outlet 214 so as to be located closer to a user's hand typically disposed below the dispensing apparatus. In accordance with the second embodiment, when the finger members 70 of the piston element 57 are received in the catch member 100 in the coupled orientation, the finger members 70 are securely held between the interior axially outwardly directed surface 114 of the inner end wall 112 and the annular sealing ring 206 so as to provide sealed engagement of the discharge outlet 64 of the piston element 57 with the upper end 210 of the discharge tube 208 on the catch member 100.

Figure 27:
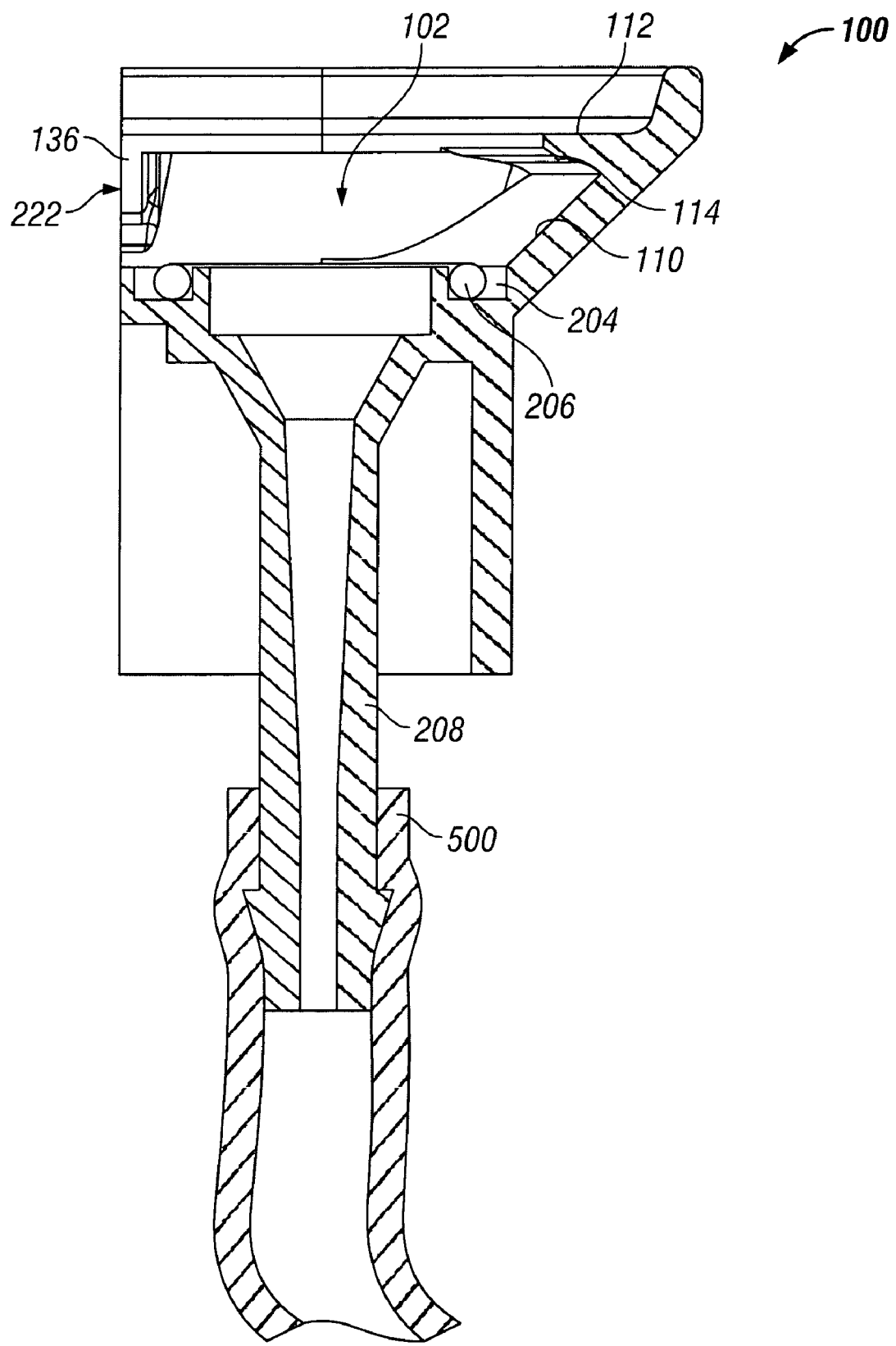
FIG. 27 is a schematic side view similar to FIG. 18, however, showing connection of the outlet to a supply tube.
Figure 28:
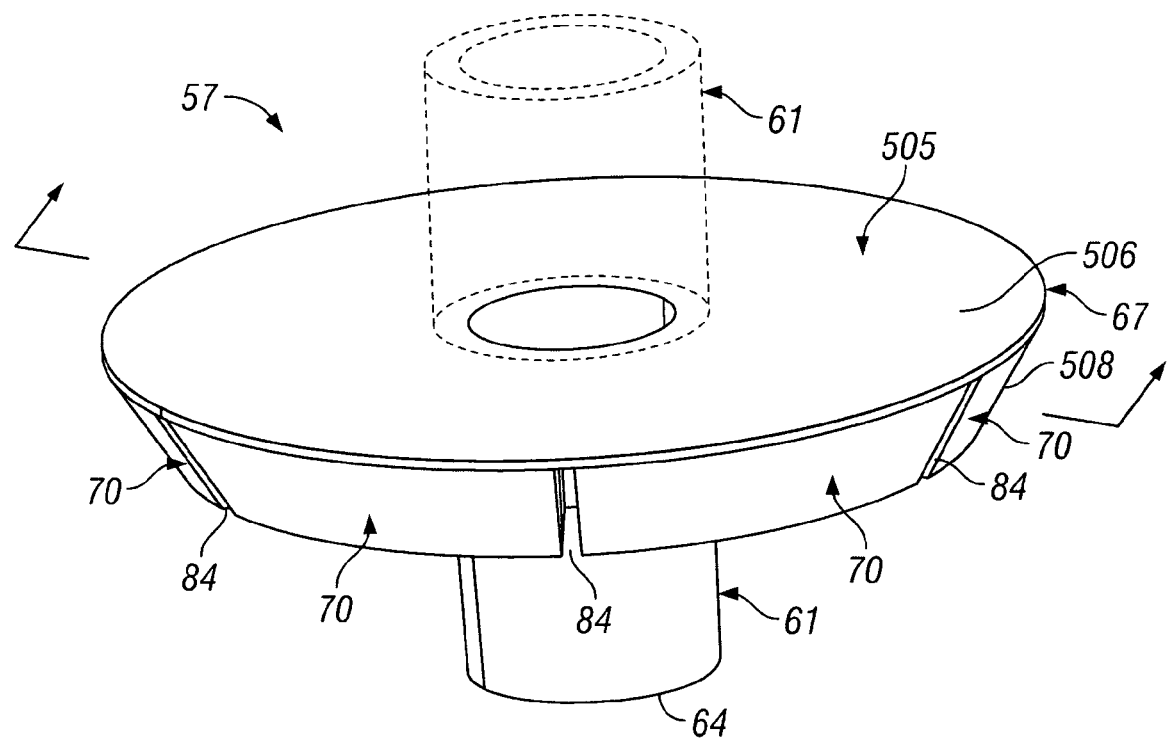
FIGS. 28, 29, 30 and 31 are a top pictorial view, a bottom pictorial view, a side view and a bottom view showing yet a further embodiment of an outer portion of a piston element carrying the resilient member, and with the resilient member in an inherent unbiased position.
Figure 29:
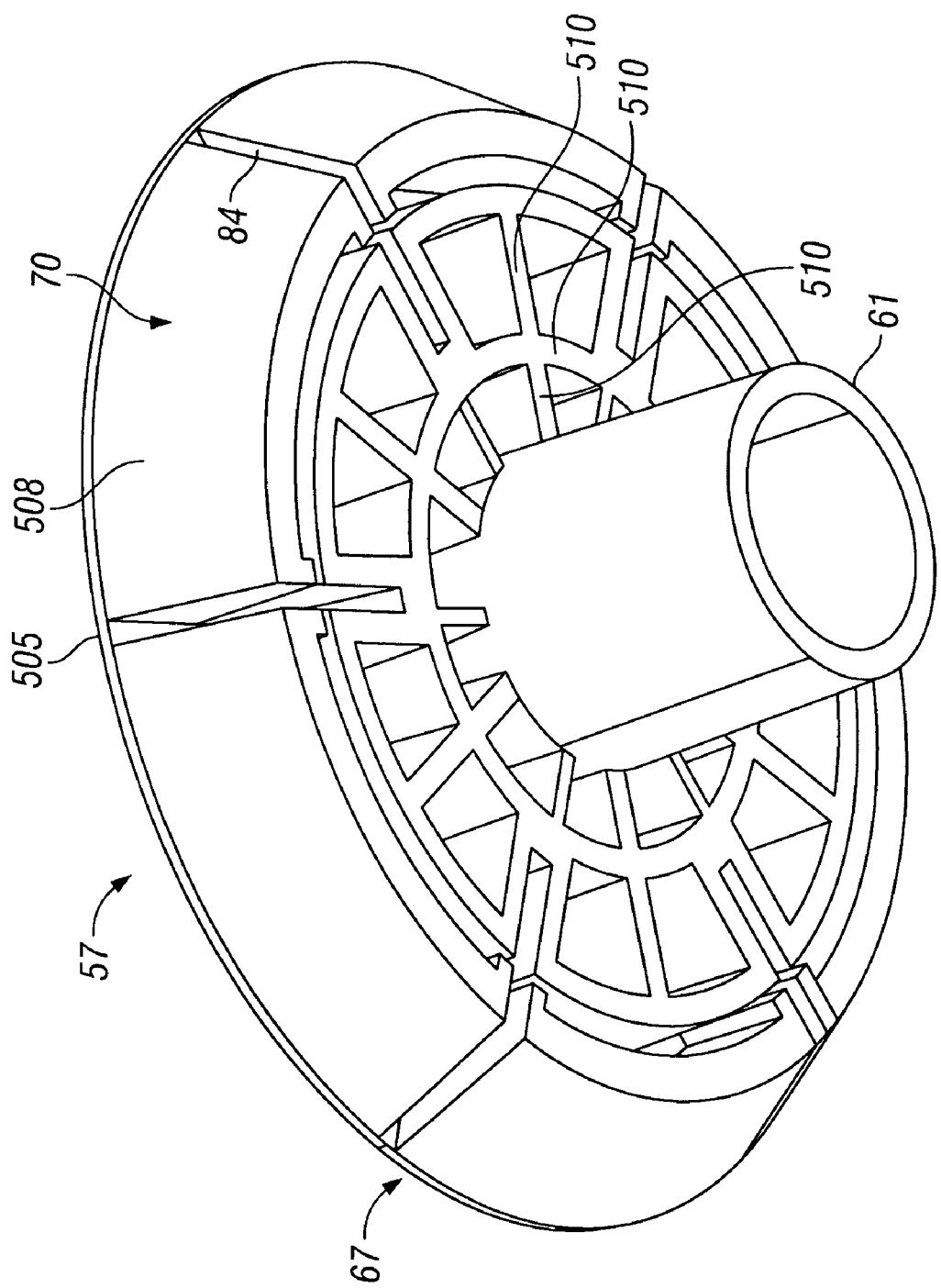
Figure 30:
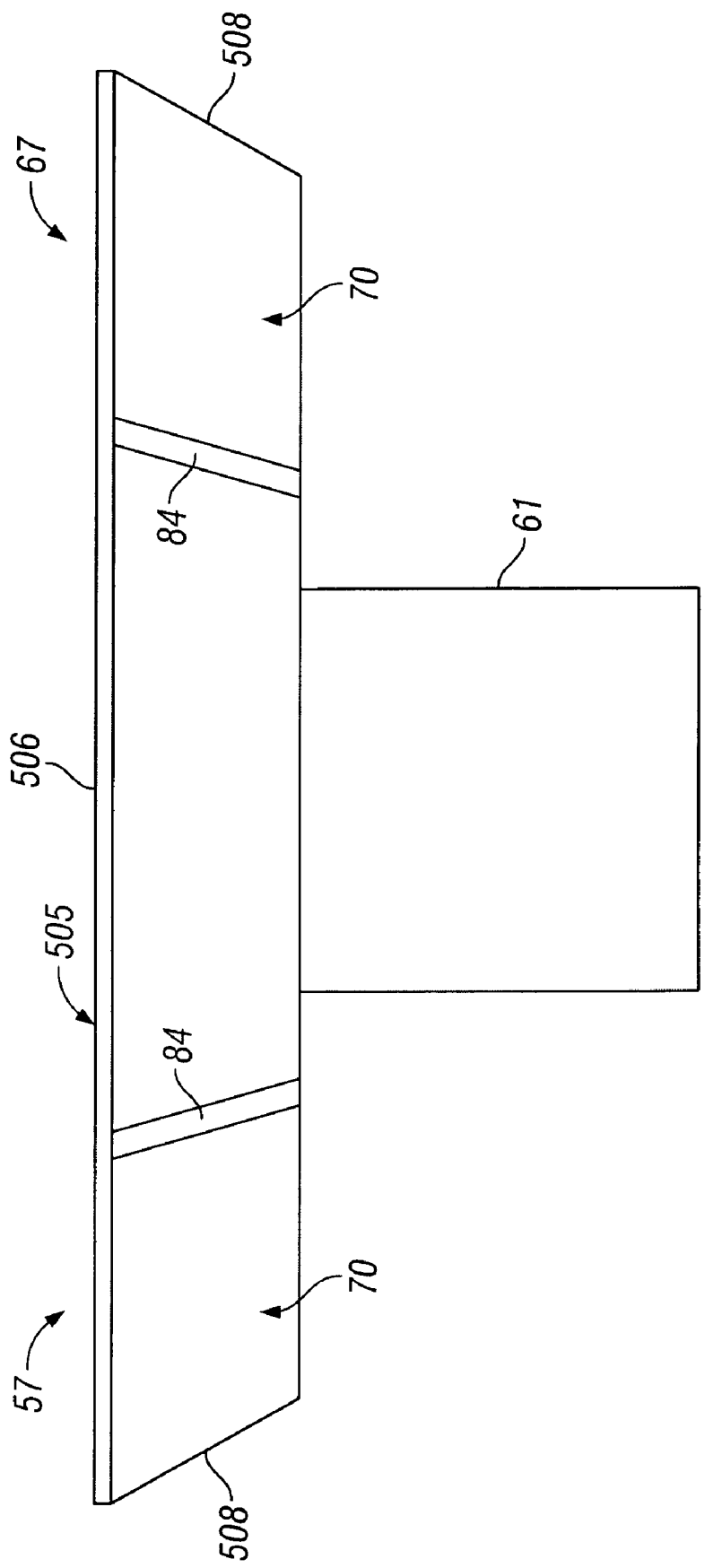
Figure 31:
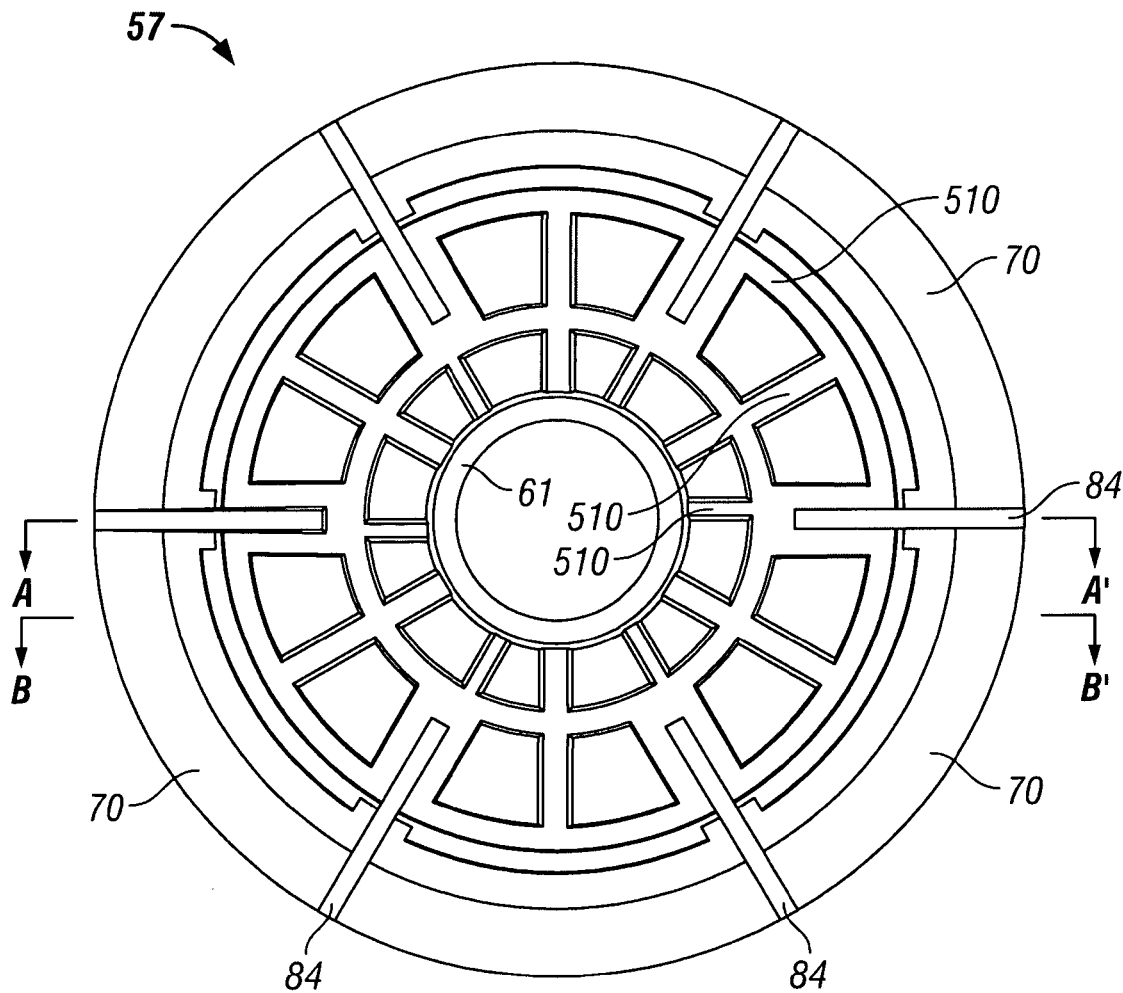

Reference is made to FIG. 27 showing a side view identical to FIG. 18 but in which below the sealing ring 206, the discharge tube 208 has been changed such that the discharge tube 208 is adapted to be engaged by a tube 500 which can direct discharged fluid to a remote location as may be advantageous in many applications including automatic dispensing of fluids into washing machines, for water treatment and many other uses without limitation. The tube 500 is preferably a flexible tube secured onto the discharge tube 208 in a friction fit, however, many other coupling arrangements may be used.

Figure 19:
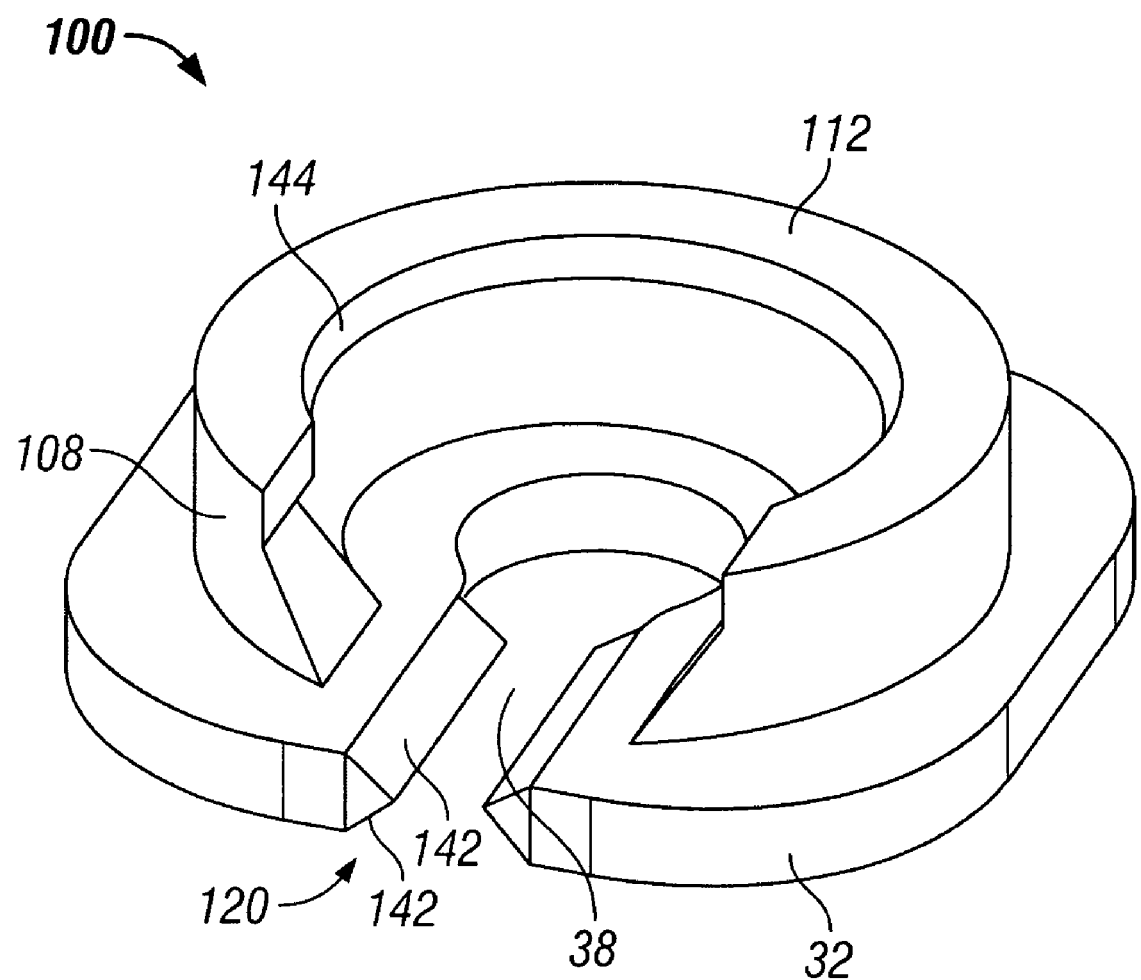
FIG. 19 is a pictorial view of a modified embodiment of a catch member from that shown in FIG. 9.
Figure 20:
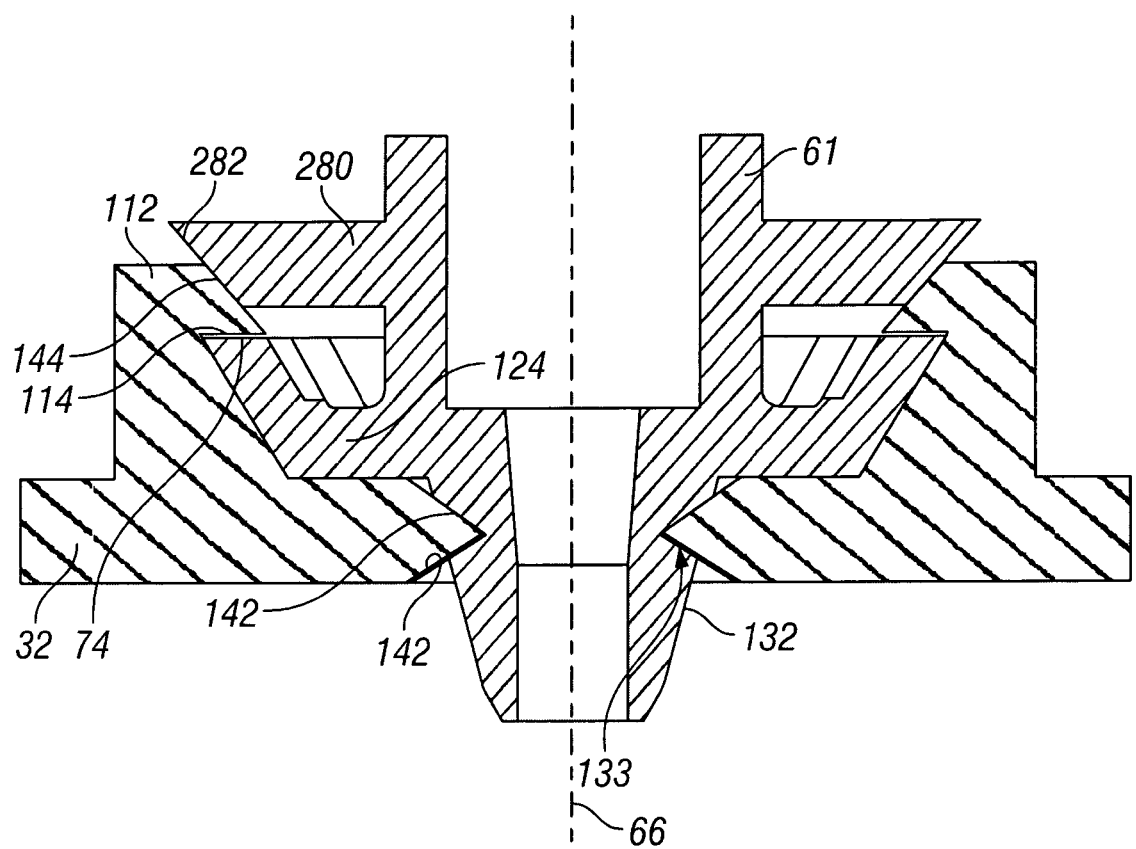
FIG. 20 is a cross-sectional side view similar to FIG. 9 but of the catch member shown in FIG. 19 and with a modified form of the movable element from that shown in FIG. 9.

Reference is made to FIGS. 19 and 20 which show a modified form of a catch member 100. The catch member 100 in FIG. 19 is similar to the catch member shown in FIG. 8, however, has the side wall 108 and the inner end wall 112 extend completely circumferentially about the axis 66 from one side of the exitway 120 to the other side of the exitway 120. In addition, the surfaces 142 about the exitway 120 on the outer end wall 32 are shown to have two facets, namely an upwardly directed facet and a downwardly directed facet which form, as seen in FIG. 20 in side view, a triangular shape. Also in FIG. 19, the inwardly directed surfaces 144 of the inner end wall 122 are circular about the axis 66. FIG. 20 shows a cross-sectional side view similar to FIG. 9 showing the catch member 100 of FIG. 19 together with a new configuration for a movable element 57 only shown in FIG. 20 in cross-section. FIG. 20 shows that the inwardly directed surfaces 144 of the inner end wall 112 are frustoconical about the axis 66 converging axially outwardly and inwardly. The inner end wall 112 does not extend radially inwardly as far as is the case in the embodiment of FIG. 9 to assist in having the fingers 70 snap into the cavity 102.

The stem 61 carries above the flange 124 a second radially outwardly extending locating flange 280 with a beveled outer surface 282 to engage on the frustoconical surface 144 of the inner end wall 112. As seen in FIG. 20, with the finger members 70 having their shoulders 74 engaged underneath the inner end wall 112 and the flange 280 engaging the axially inwardly directed frustoconical surface 144 of the inner end wall 112, the movable element 57 and the catch member 100 are secured together against relative axial movement when in the coupled orientation.

FIG. 19 shows the inwardly directed surfaces 142 of the outer end wall 32 on either side of the slotway 38 extending inwardly towards each other. The movable element 57 is shown as having its stem 61 modified outwardly of the flange 124 so as to merely comprise a frustoconical portion 132, however, which frustoconical portion 132 has an annular groove 133 extending radially thereinto which annular groove has a profile to match the surfaces 144. From the coupled orientation shown in FIG. 20 on radial movement of the movable element 57 to a radial uncoupled orientation, the annular groove 133 in the stem 61 of the movable element about the frustoconical portion 132 permits the movable element to be slid radially past the inward projections on the outer end wall 32 provided by the surfaces 142 on either side of the slotway 38.

Figure 21:
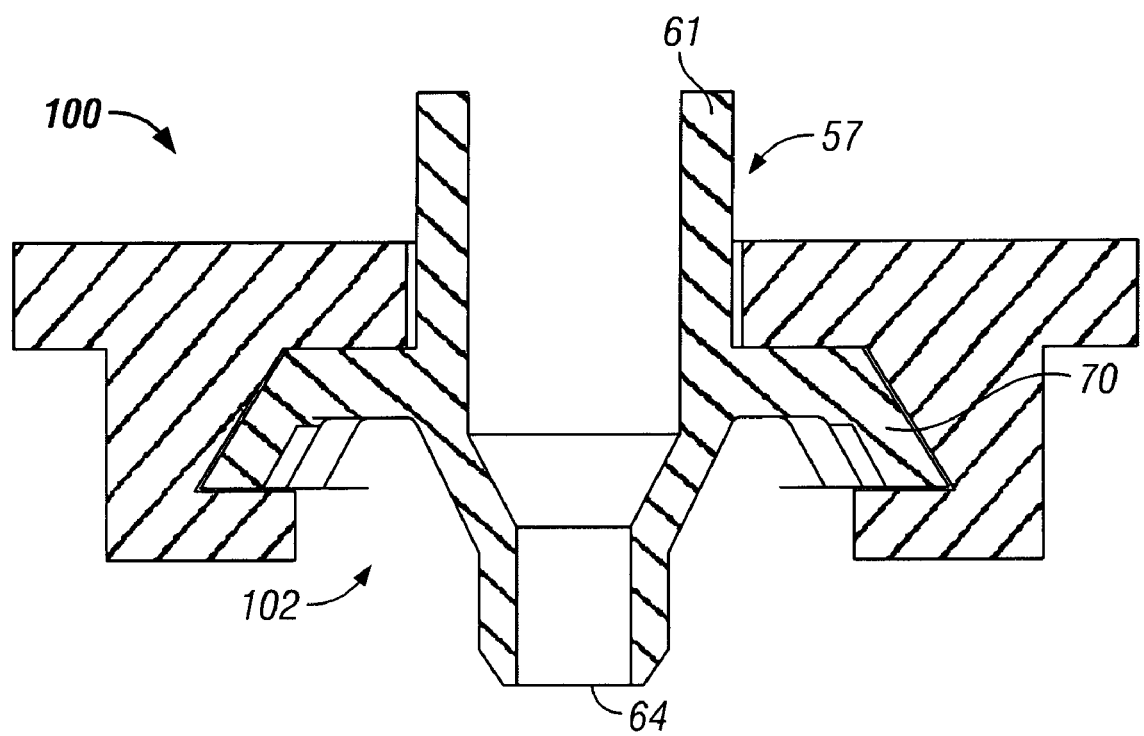
FIG. 21 is a cross-sectional side view similar to FIG. 9, however, showing another embodiment effectively inverted compared to the embodiment shown in FIG. 9.

Reference is made to FIG. 21 which shows a cross-sectional view of a catch member 100 and a movable element 57 substantially the same as that shown in FIG. 9, however, with each of the cavity 102 in the catch member 100 and the resilient fingers 57 inverted such that the movable element 57 may be moved from an axially uncoupled orientation below the catch member 100 upwardly axially into the catch member 100. The embodiment in FIG. 21 remains capable of moving radially between coupled and uncoupled orientations in an analogous manner to the embodiment in FIG. 9.

Figure 22:
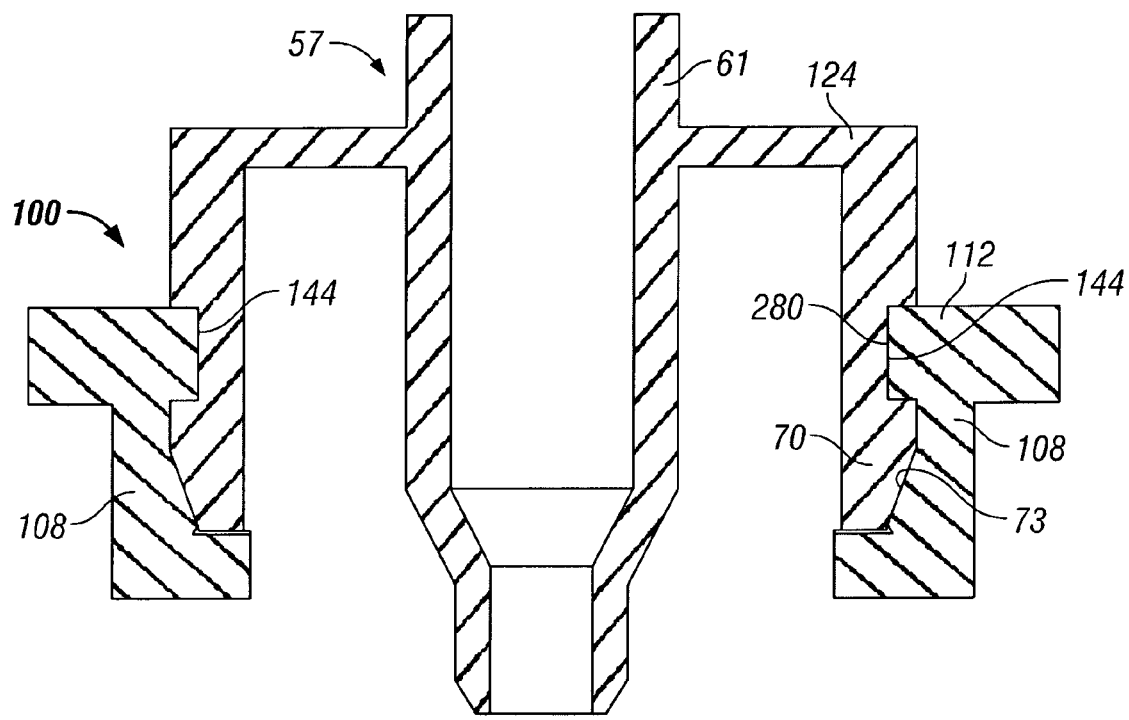
FIG. 22 is a cross-sectional side view similar to FIG. 9 but showing a catch member 100 and a movable element in accordance with a further embodiment of the present invention.

Reference is made FIG. 22 which shows another embodiment of catch member 100 and movable element 57 in accordance with the present invention in cross-section similar to that in FIG. 9. In FIG. 22, each of the finger members 70 extend forwardly, that is, actually outwardly, and substantially only axially from a support flange 124 provided on the stem 61. Each finger member 70 has a radially outwardly directed camming surface 73 which can assist in permitting the movable element 57 to move from above the catch member 100 in axially uncoupled orientation axially downwardly to a coupled orientation. In radial movement from the coupled orientation to the uncoupled orientation, the axial outer ends of the finger members 70 will be deflected by portions of the cavity about its exitway radially inwardly to permit the finger members 70 to pass radially through the exitway. Each of the finger members 70 includes an annular groove 280 thereabout adapted to receive an annularly radially inward extension of the inner end wall 112 therein. In the embodiment of FIG. 22, the radially open exitway forwardly through the inner end wall 112 should be equal to the widest diameter between the surfaces 144 of the inner end wall 112 throughout the exitway, however, the exitway will be of a reduced diameter radially of the side walls 108 such that radial inward movement of the distal outer ends of the fingers 70 permits radial movement out through the exitway.

Figure 23:
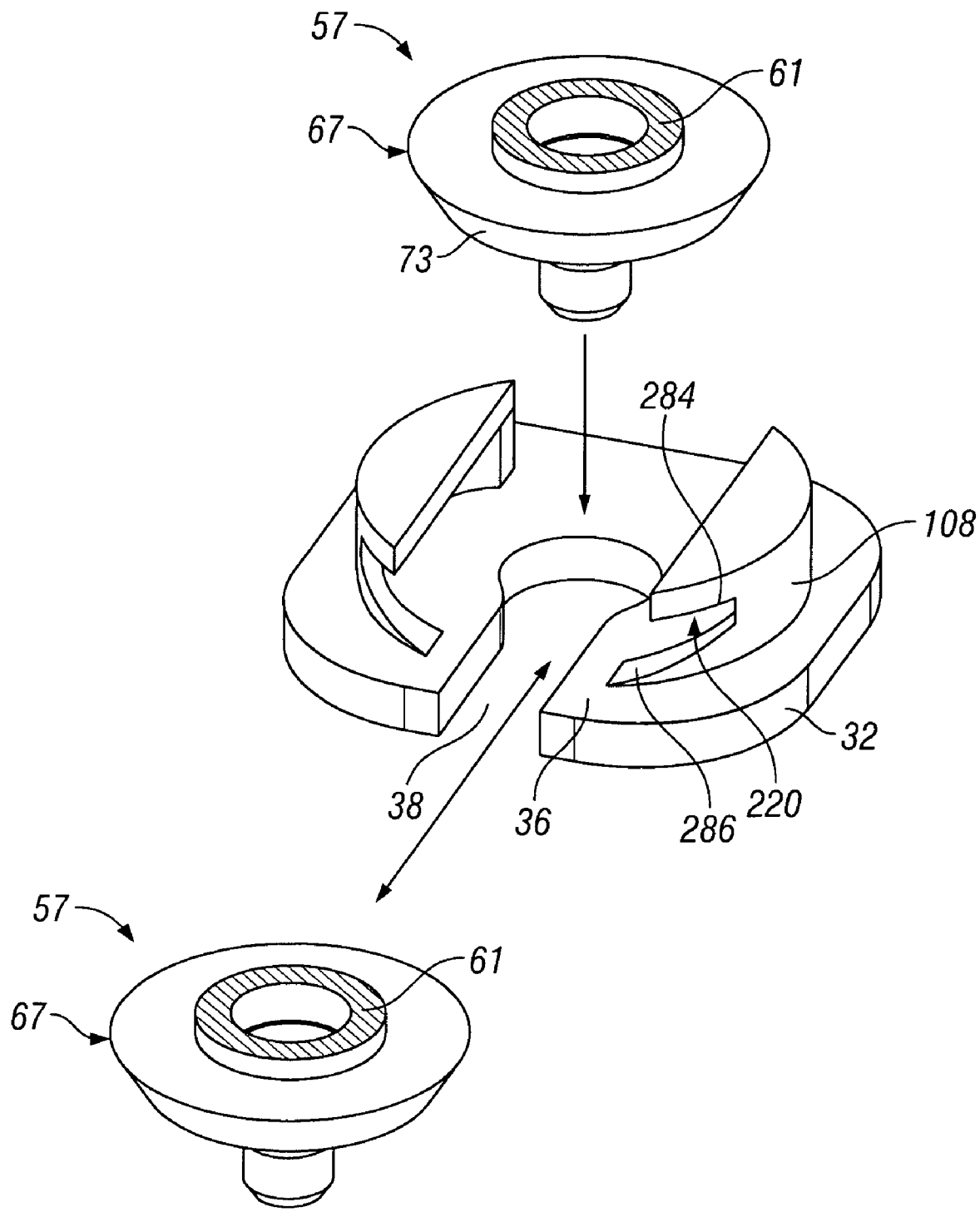
FIG. 23 is a schematic pictorial view similar to FIG. 8 but showing a further embodiment in accordance with the present invention.

FIG. 23 illustrates an embodiment in accordance with the present invention in which the engagement member 67 comprises a disc which extends radially from the stem 61 and is adapted to have its distal end deflected in an axial direction.

Figure 24:
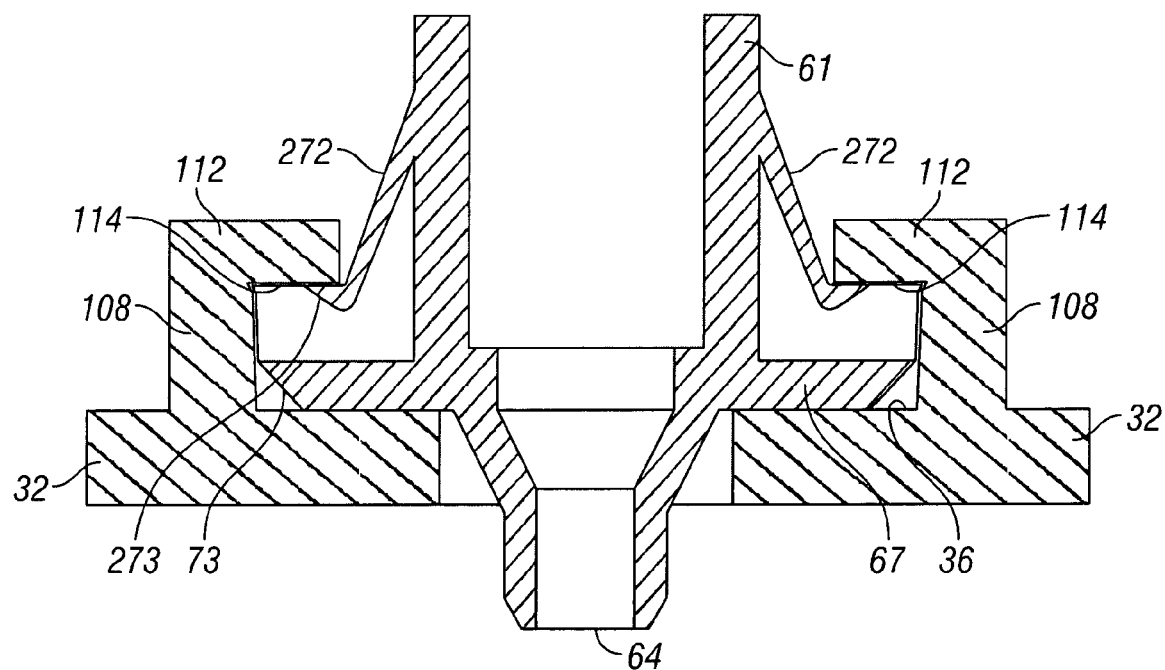
FIG. 24 is a cross-sectional side view through the embodiment of FIG. 23 in a coupled position similar to the cross-section of FIG. 9.
Figure 25:
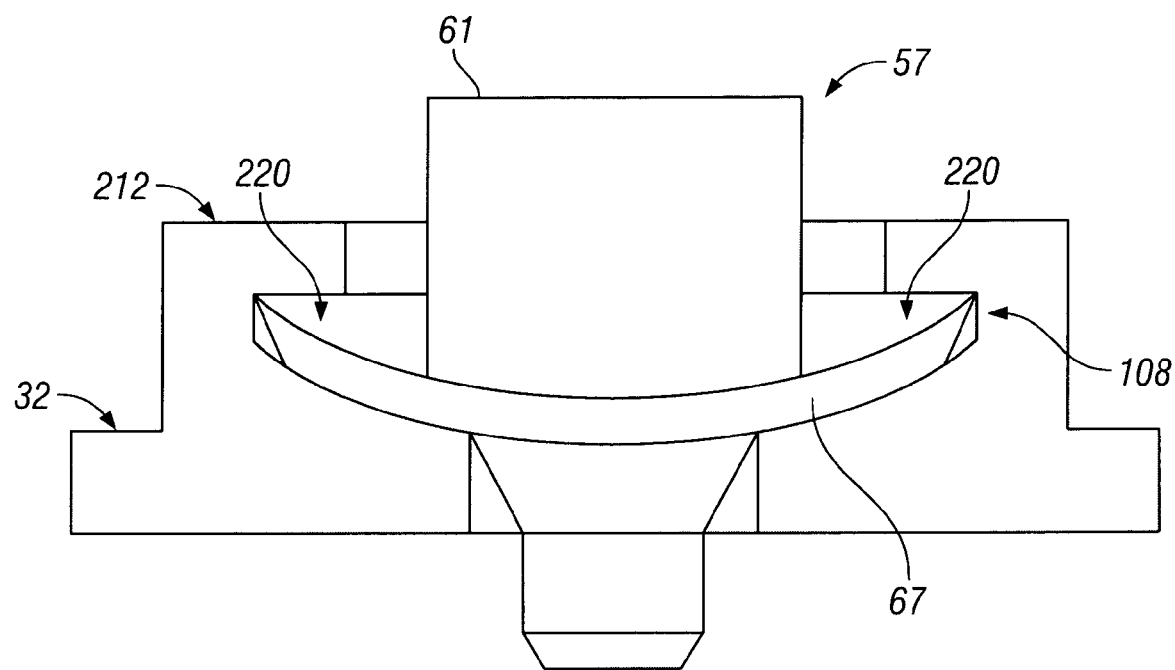
FIG. 25 is a front view of the embodiment of FIGS. 23 and 24 with the movable element moved forwardly from the uncoupled orientation.

The disc 67 is shown to have an axially outwardly and inwardly directed frustoconical camming surface 73. As best seen in FIGS. 23 and 25, the exitway 120 through the side walls 108 includes a radially extending exit slot 220 having a lower surface 286 and an upper surface 284. Proximate a central portion of the exitway 120, the lower surface 286 of the slot 220 is at the same height as the upper surface 36 of the outer end plate 32. However, the lower surface 286 of the slot 220 gradually rises upwardly as it extends radially outwardly from the slotway 38. With the piston element 57 in a coupled position as shown in FIG. 24, on initial radial movement of the movable element 57 radially in the direction of the exitway 120, the camming surfaces 73 on the resilient disc 67 will engage the lowest more forward portions of the lower surface 286 of the exit slot 220 camming the resilient disc 67 at its forward end to be deflected axially upwardly. With further radial forward movement of the piston element 57, the resilient disc 67 will come to be curved so as to have its outer distal ends curve upwardly matching the curvature of the exit slot 220 and thus permitting the resilient disc 67 to slide radially outwardly through the slot. However, insofar as the movable element 57 is disposed in the coupled position, the inherent resiliency of the resilient disc 67 will have the disc 67 assume the inherent unbiased configuration shown in FIG. 24 coaxially securing the movable element 57 in the coupled orientation within the catch member 100. While only shown in FIG. 24, some mechanism is preferably provided to prevent the movable element 57 from moving axially upwardly once it is engaged with the chamber 100 and to accomplish this preferred although not necessary objective, a plurality of resilient finger members 272 are provided which can on axial insertion come to snap past the inner end wall 112 and present radially inwardly directed catch surfaces 273 to engage the interior surfaces 114 of the inner end wall 112.

FIG. 25 shows a front view of the embodiment shown in FIGS. 23 and 24 but in a partially uncoupled configuration in which the movable element 57 has been moved forwardly into the exitway such that the resilient disc 67 is received in the exit slots 220 and has been deflected at its distal ends upwardly to assume the curved configuration of the exit slots 220 through the side walls 108 as, for example, when the largest diameter portion of the resilient disc 67 is passing through the curved slots 220 in the forward portions of the side wall 108.

Figure 26:
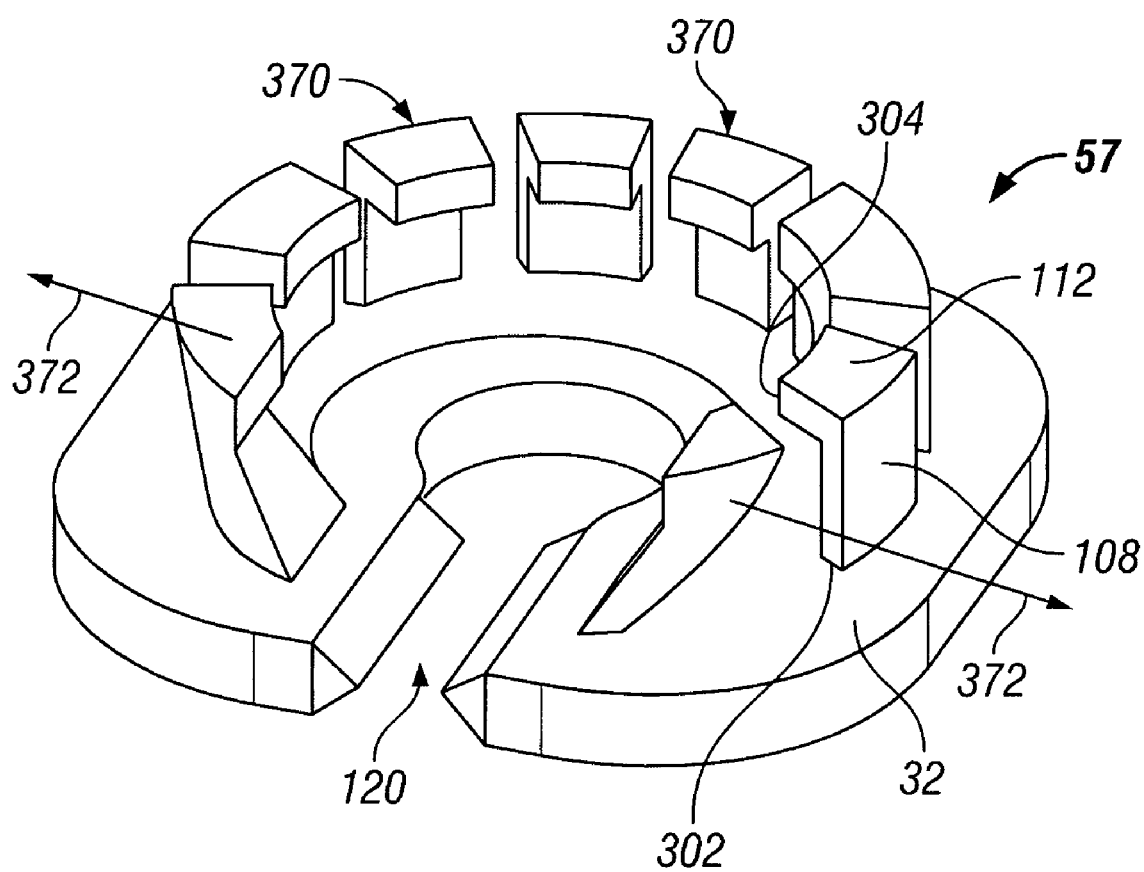
FIG. 26 is a pictorial view of a further embodiment of the forward portion of a movable element in accordance with the present invention.

Reference is made to FIG. 26 showing catch member 100 identical to that shown in FIG. 19, however, with the side wall 108 and inner end wall 112 shown as resilient finger members 370 which extend from a fixed end 302 secured to the outer end wall 32 upwardly and radially inwardly to a distal end 304. Each of these members 370 is resilient and capable of deflecting radially outwardly to assist in permitting a movable element to move from an uncoupled orientation to a coupled orientation with relative axial or radial movement. The resilient members 370 on either side of the exitway 120 may be particularly adapted for movement directly away from each other, that is, in the direction indicated by the arrows 372 in FIG. 26 as can be of assistance towards increasing the width of the exitway 120 through which the movable element 57 may radially move. While it is preferred that any movable element 57 carry resiliently deflectable members such as the fingers 70, it is to be appreciated that it is within the skill of a person skilled in the art to adopt a catch member 100 such as shown in FIG. 26 so that the catch member carries a resilient member which moves sufficiently to permit radial movement of the movable element 57 through the exitway from an uncoupled orientation.

Reference is made to FIGS. 28 to 37 which illustrate views of an outermost portion of a piston element 57 constructed with an arrangement forming a resilient radially extending disc 67 on the stem 61 which can be adapted for deflection axially and/or radially. The piston element 57 is only shown to have the resilient disc 67 with the stem 61 extending downwardly therethrough to the discharge outlet 64. However, as schematically shown in dashed lines in FIG. 28, the stem 61 of the piston element 57 would not only extend downwardly from the disc 67 but also upwardly.

The disc 67 has a top 505 with an upper surface 506 which is smooth and continuous extending radially outwardly. Individual finger members 70 are formed circumferentially about the outer periphery spaced from each other by slots 84 and adapted to be deflected radially inwardly and/or axially. Each finger 70 has an outer cam surface 508 to assist in movement axially into a suitable catch member.

The disc 67 has a grid work of reinforcing ribs 510 which extend axially downwardly from under the top 505 and may easily be molded by injection molding.

The disc 67 is adapted to be compressed radially and to also deflect axially. FIGS. 28, 29, 30 and 31 show the piston element 57 with the disc 67 in an inherent unbiased position.

Figure 34:
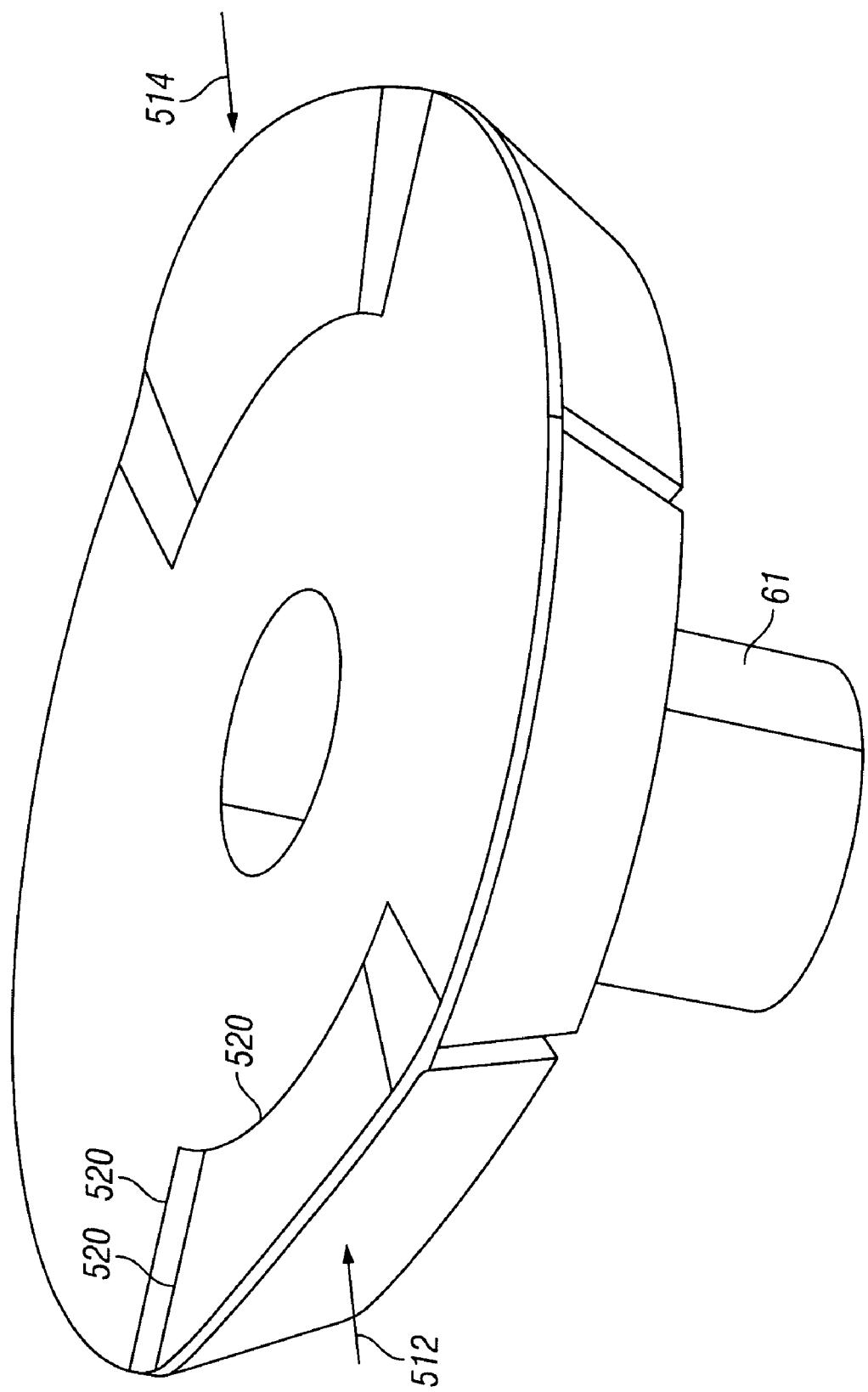
FIG. 34 is a top pictorial view of the outer portion of the piston element shown in FIG. 28 but in a deflected position.
Figure 35:
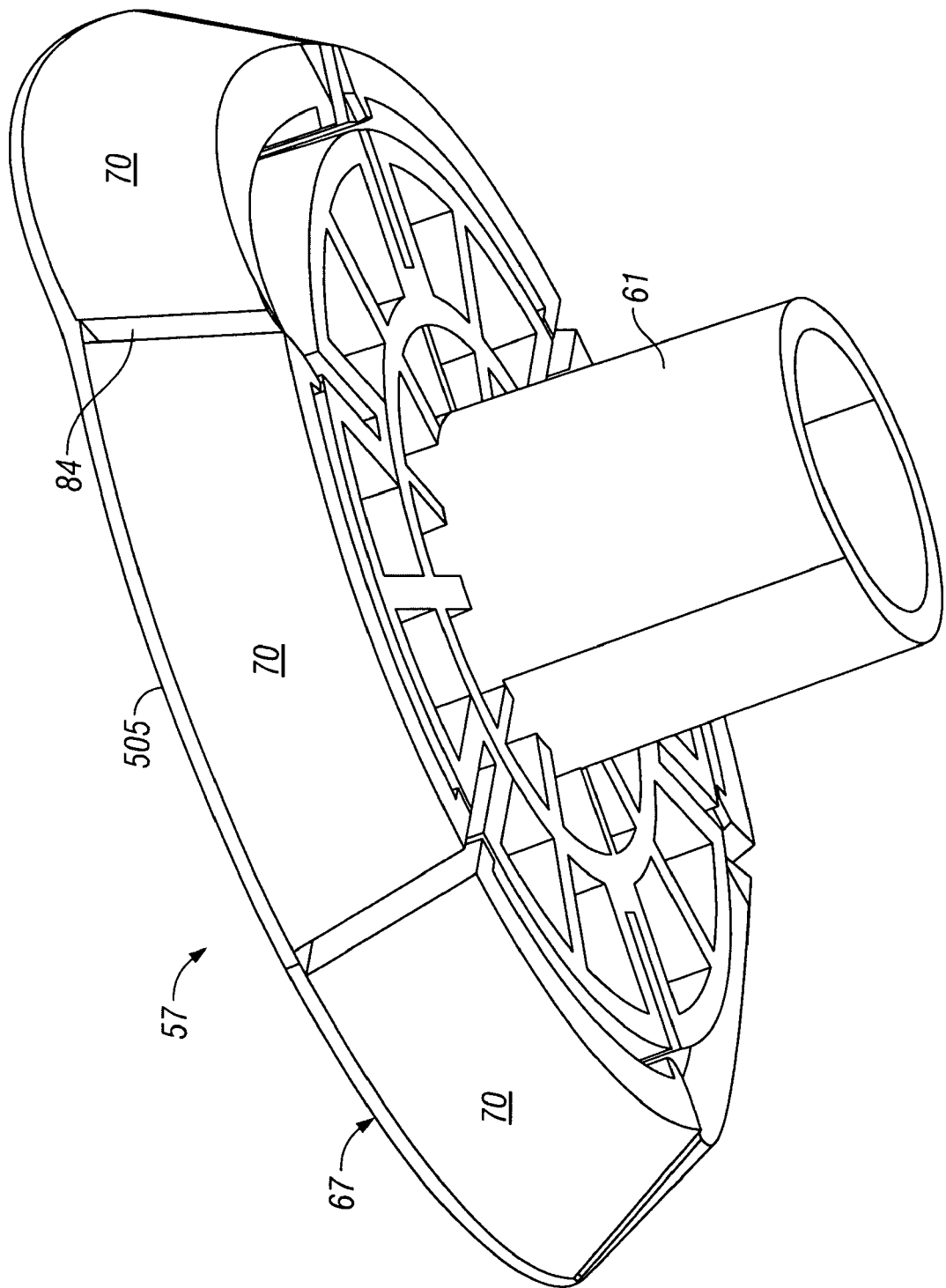
FIG. 35 is a bottom pictorial view of the piston element shown in FIG. 34.
Figure 36:
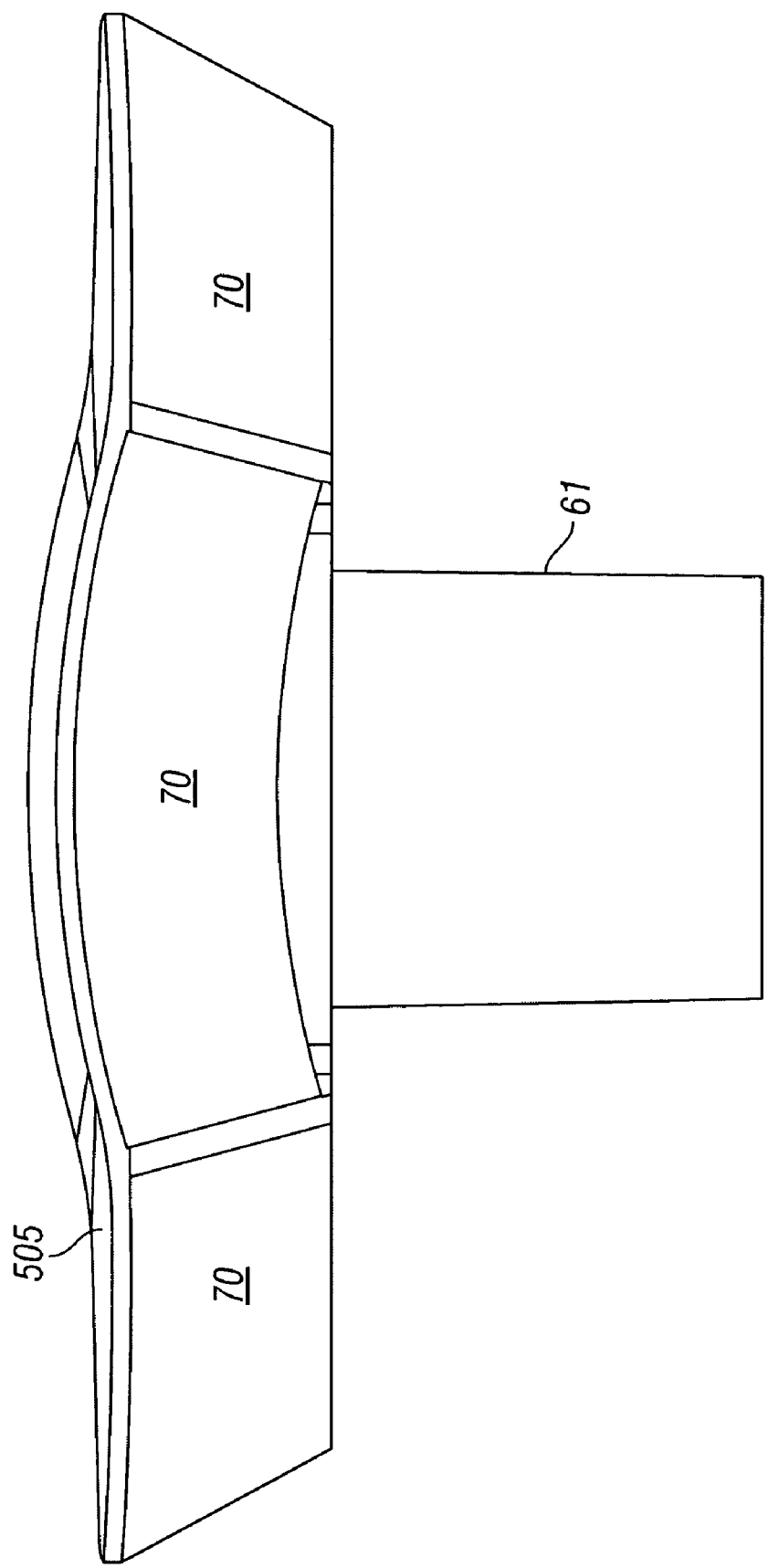
FIG. 36 is a front view of the piston element of FIG. 34.
Figure 37:
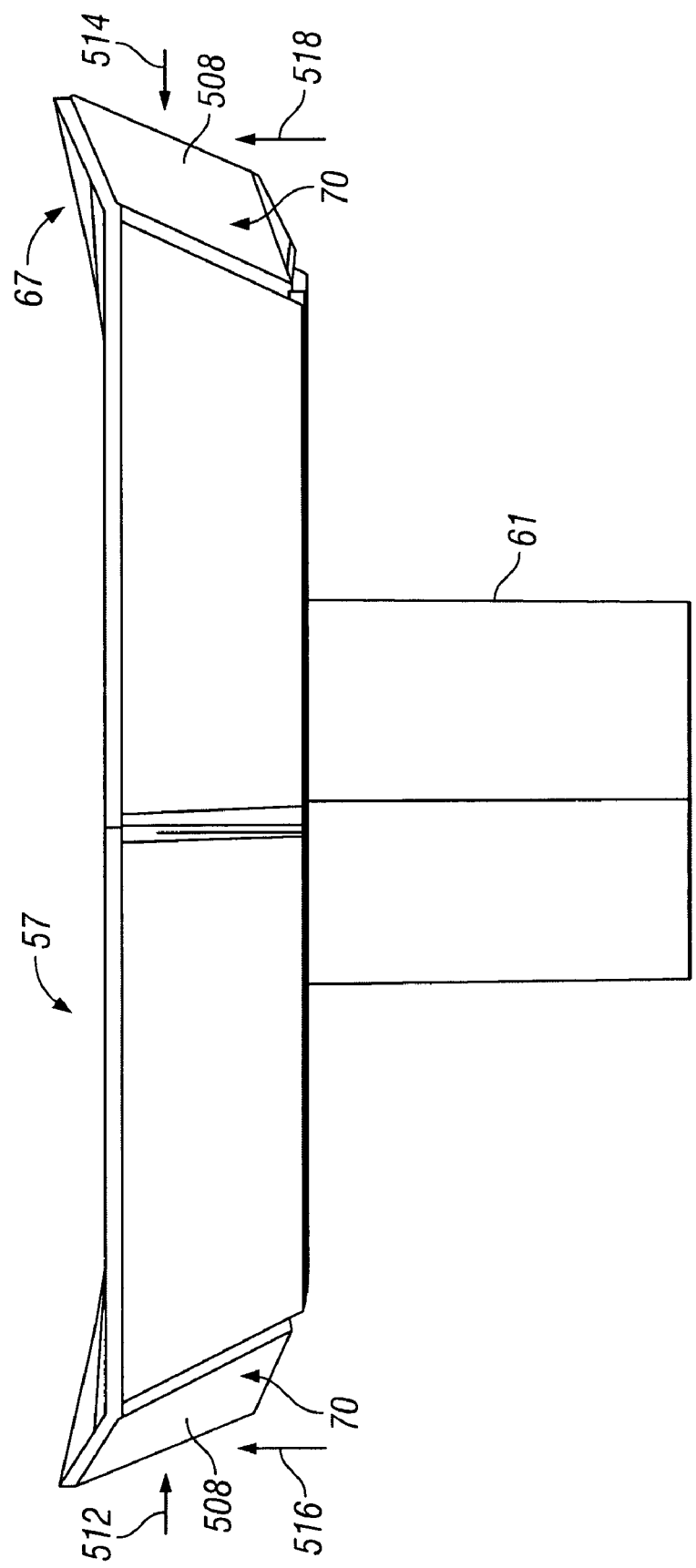
FIG. 37 is a side view of the piston element of FIG. 34.

FIG. 34 to 37 show the piston element 57 with the disc 67 in the same deflected position, which the disc 67 would assume if compressed diametrically as between two arrows shown as 512 and 514 in FIGS. 34 and 37, and/or axially as also by arrows 516 and 518 shown in FIG. 37, as with each acting on the surface 508 of the two diametrically opposed fingers 70. Since the resilient disc 67 is made of resilient material, preferably an elastomer, plastic or rubber, the disc 67 will assume the deflected position shown in FIGS. 34 to 37 with two of the fingers 70 deflected axially inwardly and marginally radially inwardly. FIG. 34 schematically shows on the upper surface 506 solid lines illustrating boundaries between different planes which the upper surface 506 may assume when deflected. These planes 520 are shown to assist in visualizing the changes to the upper surface 506 when deflected.

FIGS. 36 and 37 best show the fingers 70 as deflected axially upwardly and marginally radially inwardly.

Figure 32:
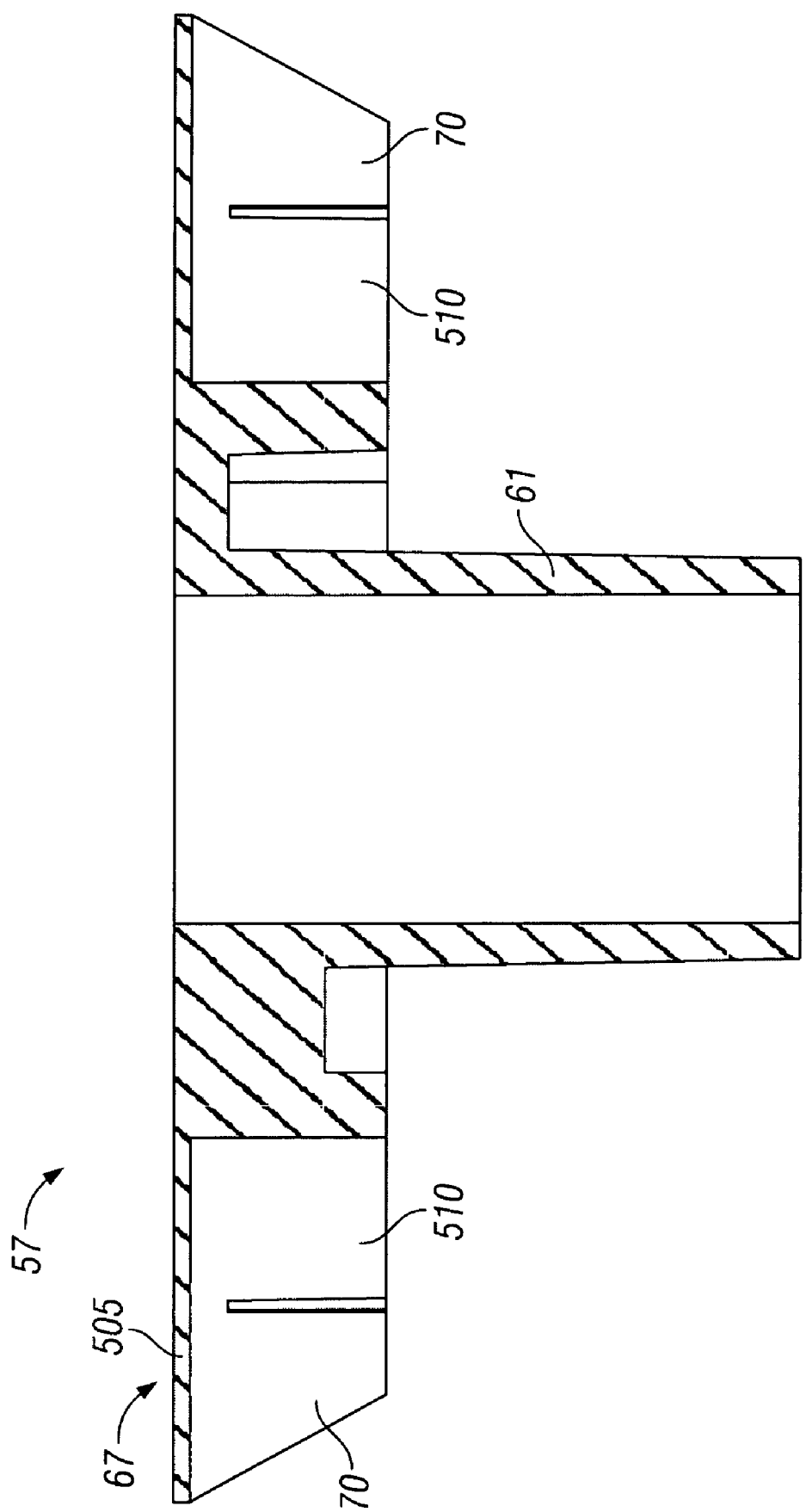
FIG. 32 is a cross-sectional side view along section line A-A' in FIG. 31.
Figure 33:
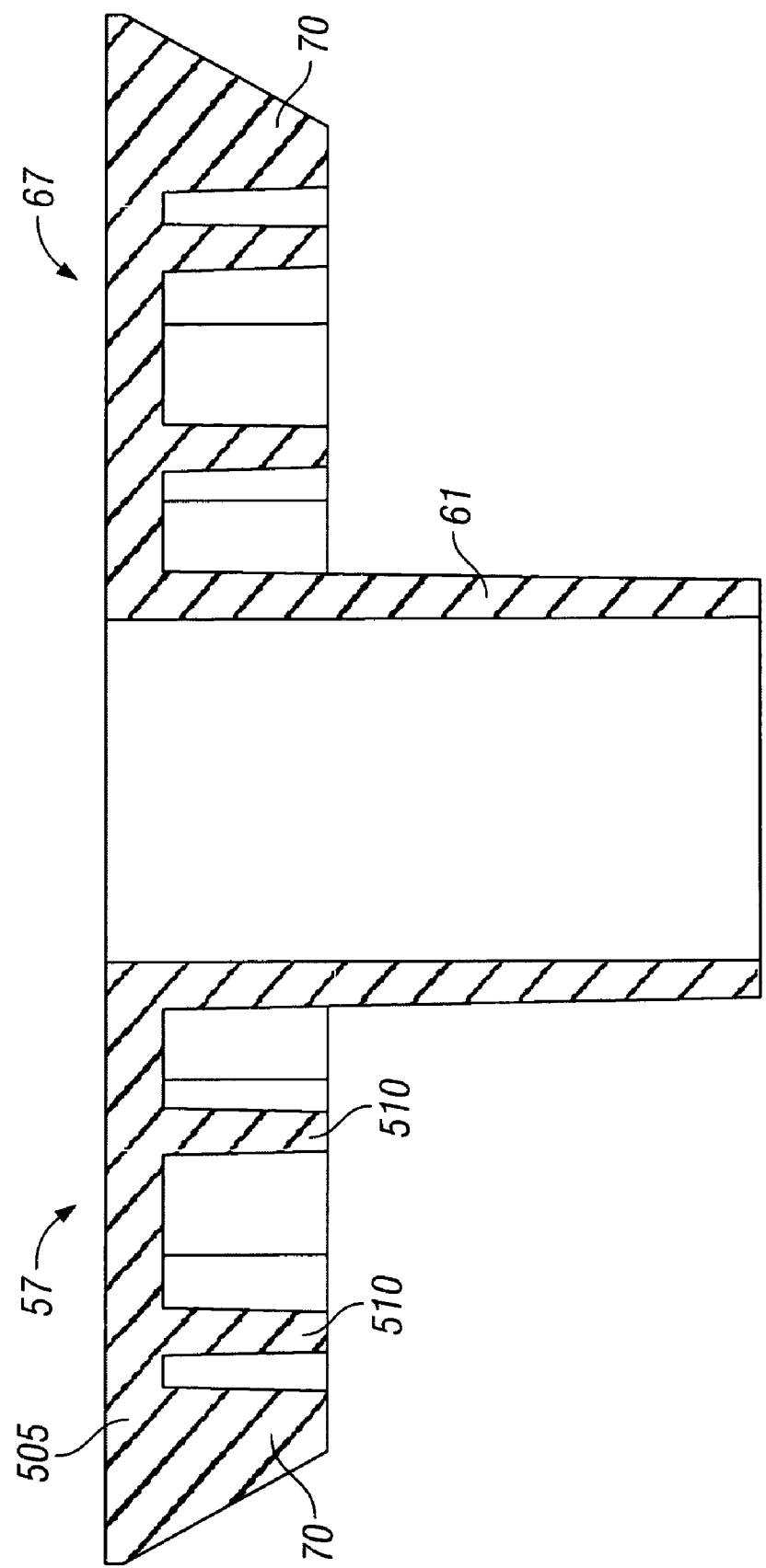
FIG. 33 is a cross-section al side view along section line B-B' in FIG. 31.

Each finger 70 is effectively only joined to the piston element 57 by the top 505 which bridges the slots 84 between adjacent finger members 70 as seen in FIG. 32 and which bridges between generally a circumferentially extending downwardly extending rib 510 radially inwardly from the finger members 70 as seen in FIG. 33. The relative flexibility, size and thickness of the top 505 as well as those of the finger members 70 can be selected to develop desired abilities of the fingers 70 to deflect.

While the invention has been described with reference to preferred embodiments, it is not so limited. Many variations and modifications will now occur to persons skilled in the art. For a definition of the invention, reference may be made to the appended claims.

We claim:

1. A dispenser for dispensing fluid comprising:
a housing,
a fluid containing reservoir having an outlet,
the housing supporting the reservoir in a dispensing position,
the reservoir being insertable into said housing to assume said dispensing position and removable therefrom for replacement,
a valving mechanism disposed across the outlet for dispensing fluid from the reservoir, the valving mechanism comprising a reciprocally movable element for reciprocal movement along an axis relative to the housing when the reservoir is in the dispensing position to dispense fluid, the housing including an actuator mechanism for actuating the reciprocally movable element, the actuator mechanism movable relative the housing between a first position and a second position, the actuator mechanism including a catch member, the movable element including an engagement mechanism to engage the catch member and releasably couple the movable element to the actuator mechanism in a coupled orientation in which movement of the actuator mechanism between the first position and the second position results in axial reciprocal movement of the movable element, the engagement mechanism comprising a resilient member extending radially outwardly from the movable element in an unbiased inherent configuration, the resilient member being resiliently deflectable radially from the inherent configuration to deflected configurations of different radial extents than the inherent configuration and biased to return to the inherent configuration when deflected from the inherent configuration, wherein from the coupled orientation on moving the movable element radially relative the catch member engagement between the catch member and the resilient member on the movable element deflects the resilient member radially from the inherent configuration to one of the deflected configurations permitting the resilient member and catch member to move radially from the coupled orientation to a radial uncoupled orientation in which the reservoir may be removed from the housing, in the coupled orientation the resilient member while in the inherent configuration engaging with the catch member to prevent moving the movable element radially relative the catch member from the coupled orientation to the radial uncoupled orientation.

2. A dispenser as claimed in claim 1 wherein from the radial uncoupled orientation on relative forcing the resilient member radially inwardly into the catch member engagement therebetween deflects the resilient member radially permitting the resilient member and catch member to move radially from the radial uncoupled orientation to the coupled orientation.

3. A dispenser as claimed in claim 1 wherein the engagement mechanism and catch member may further assume an axial uncoupled orientation in which the movable element and the actuator mechanism are aligned coaxially about the axis and from which axial uncoupled orientation on relative forcing the resilient member axially into the catch member engagement therebetween deflects the resilient member radially permitting the resilient member and catch member to move axially from the axial uncoupled orientation to the coupled orientation.

4. A dispenser as claimed in claim 1 wherein the movable element having a fluid discharge passageway axially therethrough through which fluid from the reservoir is dispensed axially through the movable element, the discharge passageway having an inner end which receives fluid from the outlet of the reservoir and an outer end out of which fluid is dispensed.

5. A dispenser as claimed in claim 4 wherein:
said resilient member comprises a plurality of resilient finger members spaced circumferentially of the axis about the movable element, each finger member coupled to the movable element at a fixed end of the finger member and extending to a distal end portion, each finger member assuming in the inherent configuration an unbiased position, each finger member being resiliently deformable from its unbiased position to biased positions.

6. A dispenser as claimed in claim 5, wherein the finger members are resiliently deformable from their respective unbiased positions to biased positions in the distal end portions can be moved radially through the catch member of the actuator member in a radial direction from the coupled orientation to the radial uncoupled orientation.

7. A dispenser as claimed in claim 6 wherein:
each resilient finger extends from its fixed end to its distal end in a direction selected from the group of extension directions consisting of; radially outwardly; radially outwardly and axially; radially inwardly; radially inwardly and axially; and axially, and each finger member being resiliently deformable from its unbiased position to biased positions in which the distal end portion is moved in a direction selected from the group of deflection directions consisting of: radially inwardly; radially outwardly; radially inwardly and axially; radially outwardly and axially; and axially.

8. A dispenser as claimed in claim 4 wherein:
the catch member having a central cavity formed therein coaxially about the axis, and wherein in the coupled orientation the movable element located coaxially within the cavity.

9. A dispenser as claimed in claim 8 wherein:
the cavity is defined within a circumferential axially extending side wall of the catch member, a radial exitway extending radially from the cavity through the side wall for passage of the movable element in moving from the coupled orientation to the uncoupled orientation, in the coupled orientation the resilient member while in the inherent configuration engaging with the side wall of catch member to prevent moving the movable element radially relative the catch member from the coupled orientation to the radial uncoupled orientation by reason of the exitway having a width normal to the axis less than a diameter of the resilient member while in the inherent configuration.

10. A dispenser as claimed in claim 8 wherein the catch member having an central cavity formed therein coaxially about the axis, and wherein in the coupled orientation the movable element located coaxially within the cavity, the cavity is defined within a circumferential axially extending side wall between a radially extending inner end wall and a radially extending outer end wall spaced axially from the inner end wall, the movable member having in the inherent configuration an exitway extending radially through the side wall, the side wall having an interior surface facing radially into the cavity, the inner end wall having an axially outwardly directed interior surface facing axially into the cavity, the outer end wall having an axially inwardly directed interior surface facing axially into the cavity, keyway portions of each of the interior surfaces of the side wall, the first end wall and the second end wall lying in a first rotational surface defined by rotation of a first shape about the axis, key portions of the exterior surfaces of the movable member lying in a second rotational surface defined by rotation about the axis when the movable member is coaxial about the axis of a second shape substantially the same shape as the first shape.

11. A dispenser as claimed in claim 8 wherein the catch member including a radial exitway extending radially from the cavity for passage of the movable element in moving from the coupled orientation to the uncoupled orientation, the exitway having a circumferential extent relative the axis which permits movement of the movable element radially relative the catch member through the exitway when the resilient member is in one of the deflected configuration yet preventing movement of the movable element radially relative the catch member through the exitway when the resilient member is in the inherent configuration.

12. A dispenser as claimed in claim 11 wherein the cavity is defined within a circumferential axially extending side wall of the catch member with the exitway extending radially through the side wall, the side wall having an interior surface facing radially inwardly into the cavity, exit camming surfaces on the interior surface of the side wall on opposite circumferentially spaced sides of the exitway for engagement with the resilient member such that from the coupled orientation on moving the movable element radially outwardly into the exitway engagement between the opposed exit camming surfaces and the resilient member compresses the resilient member radially to reduce the width of the movable member normal to the axis sufficiently that the movable member may pass radially through the exitway from the coupled orientation to the radial uncoupled orientation.

13. A dispenser as claimed in claim 12, wherein:

the resilient member comprises a plurality of resilient finger members spaced circumferentially of the axis about the movable element, each finger member coupled to the movable element at a radially inner end of the finger member and extending radially outwardly to a distal end portion, each finger member assuming in the inherent configuration an unbiased position, the finger members being resiliently deformable from their unbiased position to biased positions in which the distal end portions are moved radially inwardly.

14. A dispenser as claimed in claim 12 wherein:

the side wall having an exterior surface facing radially outwardly from the cavity, entry camming surfaces on the exterior surface of the side wall on opposite circumferentially spaced sides of the exitway for engagement with the resilient member such that from the radial uncoupled orientation on moving the movable element radially inwardly into the exitway engagement between the opposed entry camming surfaces and the resilient member compresses the resilient member radially to reduce the width of the movable member normal to the axis sufficiently that the movable member may pass radially through the exitway from the radial uncoupled orientation to the coupled orientation.

15. A dispenser as claimed in claim 14 wherein:

the cavity is defined between two axially spaced radially extending end walls of the catch member, a first inner end wall having an interior surface directed axially outwardly into the cavity and a second outer end wall having an interior surface directed axially inwardly into the cavity, in the coupled orientation engagement between axially directed surfaces on the movable element and the interior surfaces of the end walls maintains the movable element in the cavity against removal therefrom by movement in an axial direction, said resilient member comprises a plurality of resilient finger members spaced circumferentially of the axis about the movable element, each finger member coupled to the movable element at a radially inner end of the finger member and extending radially outwardly to a distal end portion, each finger member assuming in the inherent configuration an unbiased position, each finger member being resiliently deformable from its unbiased position to biased positions in which the distal end portion is moved radially inwardly, the finger members are resiliently deformable from their respective unbiased positions to biased positions in which the distal end portions are moved radially inwardly sufficiently to let the distal end portions move radially through the catch member of the actuator member in a radial direction from the coupled orientation to the radial uncoupled orientation, the resilient finger members extending both radially outwardly and axially inwardly from their radially inner end to their distal end, the finger members having axially outwardly and radially outwardly directed cam surfaces for engagement with the camming surfaces on the exterior surface of the side wall on opposite circumferentially spaced sides of the exitway to compresses the resilient member radially, the finger members having an axially inwardly facing catch surface axially inwardly of the cam surface to engage the interior surface of the first inner end wall, the finger members having an axially outwardly facing catch surface axially outwardly of the cam surface to engage the interior surface of the second outer end wall.

16. A dispenser as claimed in claim 12 wherein:

the catch member including an axial entranceway extending circumferentially about the axis axially into the cavity for passage of the movable element in moving from an axial uncoupled orientation in which the movable element is axially aligned with the cavity axially spaced therefrom to the coupled orientation, the entranceway having a diametrical extent which permits movement of the movable element axially relative the catch member through the entranceway when the resilient member is in one of the deflected configurations yet preventing movement of the movable element axially relative the catch member through the entranceway when the resilient member is in the inherent configuration.

17. A dispenser as claimed in claim 16 wherein:

the cavity is defined between a radially extending inner end wall and a radially extending outer end wall spaced axially from the inner end wall, the entranceway extending axially through the inner end wall, the first end wall having exterior surfaces facing axially inwardly inwardly from the cavity, entry camming surfaces on opposite radially spaced sides of the exterior surfaces of the inner end wall about the entranceway for engagement with the resilient member such that from the axial uncoupled orientation on moving the movable element axially into the entranceway engagement between the opposed entry camming surfaces and the resilient member compresses the resilient member radially to reduce the width of the movable member normal to the axis sufficiently that the movable member may pass axially through the entranceway from the axial uncoupled orientation to the coupled orientation.

18. A dispenser as claimed in claim 17, wherein:
the resilient member comprises a plurality of resilient finger members spaced circumferentially of the axis about the movable element,
each finger member coupled to the movable element at a radially inner end of the finger member and extending radially outwardly to a distal end portion,
each finger member assuming in the inherent configuration an unbiased position,
each finger member being resiliently deformable from its unbiased position to biased positions; (a) in which the distal end portion is moved radially inwardly sufficiently to let the distal end portions move radially pass the catch member of the actuator member in a radial direction, and (b) in which the said distal end portions are moved radially inwardly sufficiently to let the distal end portions move axially pass the catch member of the actuator member in an axial direction.

19. A dispenser as claimed in claim 18, wherein when the movable element is in the axial uncoupled orientation, on first cycling of the actuator member between the first position and the second position, the actuator member engages the distal end portions of the finger members to deflect the distal end portions to their biased positions and on the movable element assuming the coupled orientation, said distal end portion of the finger members returning to their unbiased positions coupling the movable element and catch member of the actuator mechanism in the coupled orientation.

20. A dispenser for dispensing fluid comprising:
a housing,
a fluid containing reservoir having an outlet,
the housing supporting the reservoir in a dispensing position,
the reservoir being insertable into said housing to assume said dispensing position and removable therefrom for replacement,
a valving mechanism disposed across the outlet for dispensing fluid from the reservoir, the valving mechanism comprising a reciprocally movable element for reciprocal movement along an axis relative to the housing when the reservoir is in the dispensing position to dispense fluid,
the housing including an actuator mechanism for actuating the reciprocally movable element, the actuator mechanism movable relative the housing between a first position and a second position, the actuator mechanism including a catch member,
the movable element including an engagement mechanism to engage the catch member and releasably couple the movable element to the actuator mechanism in a coupled orientation in which movement of the actuator mechanism between the first position and the second position results in axial reciprocal movement of the movable element,
the catch member having a side wall which extends axially relative the axis and circumferentially relative the axis to define a central cavity therein coaxially about the axis,
a radial exitway extending radially from the cavity through the side wall,
in the coupled orientation the movable element located coaxially within the cavity,
the engagement mechanism comprising a resilient member carried on the movable element,
the resilient member inherently assuming an unbiased inherent configuration,
the resilient member being resiliently deflectable from the inherent configuration to deflected configurations and inherently biased to return to the inherent configuration when deflected from the inherent configuration,
in the coupled orientation the resilient member while in the inherent configuration engaging with the side wall of the catch member to resist moving the movable element radially relative the catch member from the coupled orientation through the exitway to the radial uncoupled orientation,
wherein from the coupled orientation on moving the movable element radially relative the catch member toward the exitway engagement between the catch member and the resilient member on the movable element deflects the resilient member from the inherent configuration to deflected configurations conforming to a shape of the exitway so as to permit the deflected resilient member to move radially from the coupled orientation through the exitway to a radial uncoupled orientation.

21. A dispenser as claimed in claim 20 wherein:
the cavity is further defined axially between a radially extending inner end wall and a radially extending outer end wall spaced axially from the inner end wall,
the side wall having an interior surface facing radially into the cavity,
the inner end wall having an axially outwardly directed interior surface facing axially into the cavity,
the outer end wall having an axially inwardly directed interior surface facing axially into the cavity,
keyway portions of each of the interior surfaces of the side wall, the first end wall and the second end wall lying in a first rotational surface defined by rotation of a first shape about the axis,
key portions of the exterior surfaces of the movable member lying in a second rotational surface defined by rotation about the axis when the movable member is coaxial about the axis of a second shape substantially the same shape as the first shape.

* * * * *